(12) United States Patent
Bingle et al.

(10) Patent No.: US 7,619,680 B1
(45) Date of Patent: Nov. 17, 2009

(54) VEHICULAR IMAGING SYSTEM WITH SELECTIVE INFRARED FILTERING AND SUPPLEMENTAL ILLUMINATION

(76) Inventors: Robert L. Bingle, 3102 Crestbrook Dr., Zeeland, MI (US) 49464; Keith J. Vadas, 7202 Michigan Isle Rd., Lake Worth, FL (US) 33467; William Phillips, 999 Panoramic Way, Berkley, CA (US) 94704

( * ) Notice: Subject to any disclaimer, the term of this patent is extended or adjusted under 35 U.S.C. 154(b) by 928 days.

(21) Appl. No.: 10/710,412

(22) Filed: Jul. 8, 2004

Related U.S. Application Data

(60) Provisional application No. 60/481,069, filed on Jul. 8, 2003, provisional application No. 60/521,093, filed on Feb. 19, 2004.

(51) Int. Cl.
*H04N 5/225* (2006.01)
*H04N 5/235* (2006.01)

(52) U.S. Cl. ..................... 348/361; 348/342

(58) Field of Classification Search .............. 348/216.1, 348/361, 360, 342, 229.1, 362, 364, 366
See application file for complete search history.

(56) References Cited

U.S. PATENT DOCUMENTS

| | | | |
|---|---|---|---|
| 4,069,168 A | 1/1978 | Leatherman et al. | |
| 4,695,878 A * | 9/1987 | Levine et al. | ............ 348/216.1 |
| 5,523,811 A | 6/1996 | Wada et al. | |
| 5,982,423 A * | 11/1999 | Sekiguchi | ................. 348/216.1 |
| 6,172,600 B1 * | 1/2001 | Kakinami et al. | ............ 340/435 |
| 6,377,191 B1 | 4/2002 | Takubo | |
| 6,400,835 B1 | 6/2002 | Lemelson et al. | |
| 6,550,949 B1 * | 4/2003 | Bauer et al. | .................. 362/545 |
| 6,942,151 B2 * | 9/2005 | Ehrhart | .................. 235/462.25 |
| 7,170,547 B2 * | 1/2007 | Uchiyama et al. | .............. 348/49 |
| 2001/0000674 A1 * | 5/2001 | Yasuda | ........................ 348/349 |
| 2001/0019482 A1 | 9/2001 | Kobayashi et al. | |
| 2002/0003571 A1 | 1/2002 | Schofield et al. | |
| 2002/0118282 A1 | 8/2002 | Nakamura | |
| 2002/0163586 A1 * | 11/2002 | Noguchi | ...................... 348/342 |
| 2003/0016125 A1 | 1/2003 | Lang et al. | |
| 2003/0098914 A1 * | 5/2003 | Easwar | ..................... 348/229.1 |
| 2003/0117522 A1 | 6/2003 | Okada | |

FOREIGN PATENT DOCUMENTS

JP 01105686 A * 4/1989

* cited by examiner

*Primary Examiner*—Lin Ye
*Assistant Examiner*—Nicholas G Giles
(74) *Attorney, Agent, or Firm*—McGarry Bair PC

(57) ABSTRACT

An imaging system for use in an exterior or interior of a vehicle comprises a camera having an image sensor with an associated optical path and viewing area and an infrared filter associated with the image sensor for automatically selectively attenuating infrared radiation according to light conditions of the viewing area. The imaging system can further comprise a selectively acutable supplemental illumination system comprising at least one light source for providing supplemental illumination to the viewing area of the camera.

35 Claims, 20 Drawing Sheets

VEHICULAR IMAGING SYSTEM WITH SELECTIVE INFRARED FILTERING AND SUPPLEMENTAL ILLUMINATION

CROSS-REFERENCE TO RELATED APPLICATIONS

This application claims the benefit of U.S. Patent Application No. 60/481,069, filed Jul. 8, 2003, and U.S. Patent Application No. 60/521,093, filed Feb. 19, 2004.

FIELD OF THE INVENTION

The invention relates generally to vehicular imaging systems. In one of its aspects, the invention relates to a vehicular imaging system with selective infrared filtering. In another of its aspects, the invention relates to a vehicle imaging system and a supplemental illumination system. In yet another of its aspects, the invention relates to a vehicle imaging system with selective infrared filtering and supplemental illumination.

DESCRIPTION OF THE RELATED ART

In the automotive industry, there is an ongoing effort to improve the overall safety of vehicles during operation and to develop technology to prevent accidents from occurring. Numerous collisions, whether involving only one vehicle or between two or more vehicles, can be caused by the driver's inadequate view of the rear environment of the automobile while backing up, parallel parking, changing lanes, etc. The driver might not have the rear and side view mirrors properly oriented, and even if the mirrors are in the correct positions, there are often umbral regions or "blind spots," such as on the side of the vehicle, behind the rear corners of the vehicle, or the area directly behind the vehicle and near the ground, that are not within the driver's field of view. As a result, the driver might not be able to see other vehicles, humans, animals, or inanimate objects that lie in the direction of travel of the automobile. One solution to this problem is to strategically position a digital video camera on the vehicle and provide a small display in the cabin for the driver. Such cameras can also be used to observe a trailer located at the rear of the vehicle and to view and monitor children inside the vehicle.

Vehicular digital cameras comprise image sensors, such as a charge coupled device (CCD) or a complimentary metal oxide semiconductor (CMOS), comprising a collection of light-sensitive diodes that convert photons or light into a voltage or current, which are ultimately converted into an image. Each pixel on the sensor has an associated exposure or integration time, which corresponds to the duration that the pixels are exposed to light and can range from microseconds to seconds depending on the sensor and configuration. An exposure register internal to the sensor represents these integration times by an integer value (1.255 for 8-bit systems). The corresponding voltage(s) or current(s) from the sensor are amplified before being converted to a digital representation. In the amplifier, each pixel(s) voltage or current equivalent is subjected to a multiplier, increasing its value, which is also referred to as gain. The amount of gain applied is determined by an Automatic Gain Control (AGC) algorithm to ultimately produce a high-quality, useful image. The gain changes according to the light conditions and is a function of the exposure. For example, in low light conditions, if the exposure reaches 255 and the image is still dark, then the gain is increased to effectively brighten the pixels to produce an image that can be discerned by the viewer. If the gain doubles, the exposure is reduced to one-half of its previous value. Because the gain is applied to the all of the pixels, including the noise, the gain is preferably low, such as 1, but in some low light conditions, as provided in the above example, the gain must be increased to produce a visible image. Hence, the AGC applies and modifies the gain by compromising between the image fidelity and useful images.

Imaging sensors require sufficient light to capture clear, high-quality images. The CCD cameras do not require as much light as CMOS cameras, but the CCD cameras are inadequately sized for preferred placement in or on the vehicle and are often too expensive for vehicular applications. The CMOS cameras are generally smaller in size than the CCD technology cameras and are relatively less costly to manufacture. However, one disadvantage of a CMOS image sensor is its low light sensitivity. Generally, CMOS sensors are less effective in poor or low light situations and, therefore, require greater illumination to produce an image with acceptable clarity. Further, standard rear lighting systems, such as tail lamps, light bars for illuminating the license plate, and center high mounted stop lamps (CHMSL), do not provide sufficient illumination for CMOS and other low-cost cameras over the complete targeted area.

Another problem with image sensors results from exposure to infrared (IR) radiation during high light conditions. IR radiation, which is present in sunlight and in certain types of artificial light, is typically undesirable for imaging in normal daylight conditions because it tends to wash out the colors and renders the images unclear. To thwart this effect, cameras can include a filter that attenuates near-IR and IR radiation to thereby prevent transmission thereof to the image sensor. However, when ambient light levels are low, such as during the night or on cloudy days, IR radiation actually improves image quality; therefore, transmission of IR radiation to the image sensor under these conditions is highly desirable. CMOS and CCD image sensors are very efficient in the IR and near-IR wavelengths and produce higher quality images in low light conditions when they are exposed to IR radiation.

SUMMARY OF THE INVENTION

In one aspect, an imaging system for use in an exterior or interior of a vehicle comprises a camera having an image sensor with an associated optical path and an infrared filter associated with the image sensor for attenuating infrared radiation. The infrared filter is movable from a first position, wherein the infrared filter is disposed in the optical path of the image sensor for preventing transmission of the infrared radiation to the image sensor, and a second position, wherein the infrared filter is spaced from the optical path of the image sensor and does not prevent transmission of the infrared radiation to the image sensor.

The infrared filter can move as a result of an output of the camera, wherein the output is indicative of light conditions in a viewing area of the camera. The output can be a gain determined by an Automatic Gain Control, a value representative of a gain determined by an Automatic Gain Control, an exposure, or a white balance. When the output is less than a first threshold, the infrared filter is in the first position, and when the output is greater than a second threshold, the infrared filter is in the second position. The second threshold is greater than the first threshold, and the second threshold can be twice the first threshold.

The infrared filter can automatically move between the first position and the second position as a result of light conditions in a viewing area of the camera. The imaging system can further comprise a solenoid that moves the infrared filter between the first position and the second position. Alternatively, the infrared filter can be manually moved between the first position and the second position.

The camera can further comprise an infrared filter holder for mounting the infrared filter to the camera. The infrared filter holder can pivot relative to the image sensor to move the infrared filter between the first position and the second position. The image sensor comprises a focal length, and the infrared filter preferably has a thickness that does not substantially change the focal length of the image sensor as the infrared filter moves between the first position and the second position.

The imaging system can further comprise a supplemental illumination system comprising at least one light source for providing supplemental illumination to a viewing area of the camera. The at least one light source can comprise a light emitting diode. The light emitting diode can be an infrared light emitting diode, a white light emitting diode, or a colored light emitting diode. The camera and the supplemental illumination system can form a unitary module.

The vehicle can comprise a license plate lightbar, and the supplemental illumination system can be mounted to the lightbar. The vehicle can comprise a center high mount stop lamp, and the supplemental illumination system can be mounted to the center high mount stop lamp. The vehicle can comprise at least one tail lamp, and the supplemental illumination system can be mounted to the at least one tail lamp. The at least one light source can be directed rearwardly of the vehicle.

The supplemental illumination system can be selectively actuable when the imaging system is activated. The supplemental illumination system can be selectively actuable when the infrared filter is automatically positioned in one of the first position and the second position in accordance with light conditions in a viewing area of the camera.

The image sensor is preferably a complimentary metal oxide semiconductor. The infrared radiation can comprise wavelengths between about 700 nm and 1 mm, and the infrared radiation can comprise near-infrared radiation.

In another aspect, an imaging system for use in an exterior or interior of a vehicle comprises a camera having an image sensor with an associated optical path and viewing area and an infrared filter positioned in the optical path of the image sensor for selectively attenuating infrared radiation, and the attenuation of the infrared radiation by the infrared filter is a function of ultraviolet radiation in the viewing area. The infrared filter can attenuate the infrared radiation when intensity of the ultraviolet radiation in the viewing area is above a predetermined value and can transmit the infrared radiation when the intensity of the ultraviolet radiation in the viewing area is below a predetermined value.

The infrared filter can comprises a photochromic coating. The photochromic coating can comprise tungsten hexacarbonyl. The photochromic coating can be disposed on the image sensor. The camera can further comprise a glass element in front of the image sensor, and the photochromic coating can be disposed on the glass element. The camera can further comprise a second glass element laminated to the glass element, and the photochromic coating can be disposed on the second glass element. The camera can further comprise a camera lens, and the photochromic coating can be disposed on the camera lens. The camera lens can comprise several lens elements, and the photochromic coating can be disposed between adjacent lens elements. The camera lens can comprise an outermost lens element, and the photochromic coating can be disposed on the outermost lens element. The imaging system can further comprise a housing for the camera, and the photochromic coating can be applied to the housing. The housing can comprises a housing lens, and the photochromic coating can be applied to the housing lens. The imaging system can further comprise a glass piece mounted to the housing, and the photochromic coating can be applied to the glass piece.

In yet another aspect, an imaging system for use in an exterior or interior of a vehicle comprises a camera having an image sensor with an associated optical path and viewing area and an infrared filter associated with the image sensor for selectively attenuating infrared radiation, and the infrared filter is automatically responsive to light conditions in the viewing area such that the infrared filter prevents the image sensor from being exposed to infrared radiation when light conditions in the viewing area correspond to daylight conditions and does not prevent the image sensor from being exposed to infrared radiation when the light conditions in the viewing area correspond to low light conditions.

The infrared filter can be permanently disposed in the optical path. The attenuation of the infrared radiation by the infrared filter can be a function of ultraviolet radiation in the viewing area. The infrared filter can attenuate the infrared radiation when intensity of the ultraviolet radiation in the viewing area is above a predetermined value characteristic of daylight conditions and can transmit the infrared radiation when the intensity of the ultraviolet radiation in the viewing area is below a predetermined value characteristic of low light conditions.

The infrared filter can be movable from a first position, wherein the infrared filter is disposed in the optical path of the image sensor for preventing transmission of the infrared radiation to the image sensor, and a second position, wherein the infrared filter is spaced from the optical path of the image sensor and does not prevent transmission of the infrared radiation to the image sensor. The infrared filter can move as a result of an output of the camera, wherein the output is indicative of light conditions in a viewing area of the camera. The output can be a gain determined by an Automatic Gain Control or a value representative of a gain determined by an Automatic Gain Control. When the output is less than a first threshold, the infrared filter is in the first position, and when the output is greater than a second threshold, the infrared filter is in the second position. The second threshold is greater than the first threshold, and the second threshold can be twice the first threshold.

The imaging system can further comprise a supplemental illumination system comprising at least one light source for providing supplemental illumination to the viewing area of the camera. The at least one light source can comprise a light emitting diode. The supplemental illumination system can be selectively actuable when the imaging system is activated.

DETAILED DESCRIPTION OF THE INVENTION

The invention addresses the problems of the prior art by providing a vehicular imaging system with an infrared (IR) filter located in the optical path of a image sensor and movable out of the optical path of the image sensor. Preferably, the IR filter is automatically moved relative the optical path of the image sensor. For example, the IR filter can be moved in response to a image sensor output that is indicative of the lighting conditions in the image sensor environment, such as a gain applied to pixels of the image. Alternatively, the IR filter is a photochromic IR filter and is transparent to infrared radiation in the absence of ultraviolet (UV) light, such as during the night or cloudy days. When exposed to UV rays, as in direct sunlight, the photochromic IR filter undergoes a chemical change and, as a result, absorbs and thereby filters IR radiation. The degree to which IR radiation is filtered can vary with the intensity of the UV rays. Because IR radiation is essential when ambient light levels are low and undesired during normal daylight conditions, the movable IR filter and the photochromic IR filter automatically ensure optimal lighting conditions for the image sensor.

To alleviate the lighting problems associated with using complimentary metal oxide semiconductor (CMOS) cameras or other similar cameras for vehicle imaging systems, the invention provides a supplemental illumination system to illuminate the camera viewing area. Although CMOS cameras are shown and discussed herein as a preferred embodiment, it will be understood that a charge coupled device (CCD) camera, CMOS camera, or any other camera or other suitable imaging device can be employed without departing from the scope of this invention.

Figure 1:
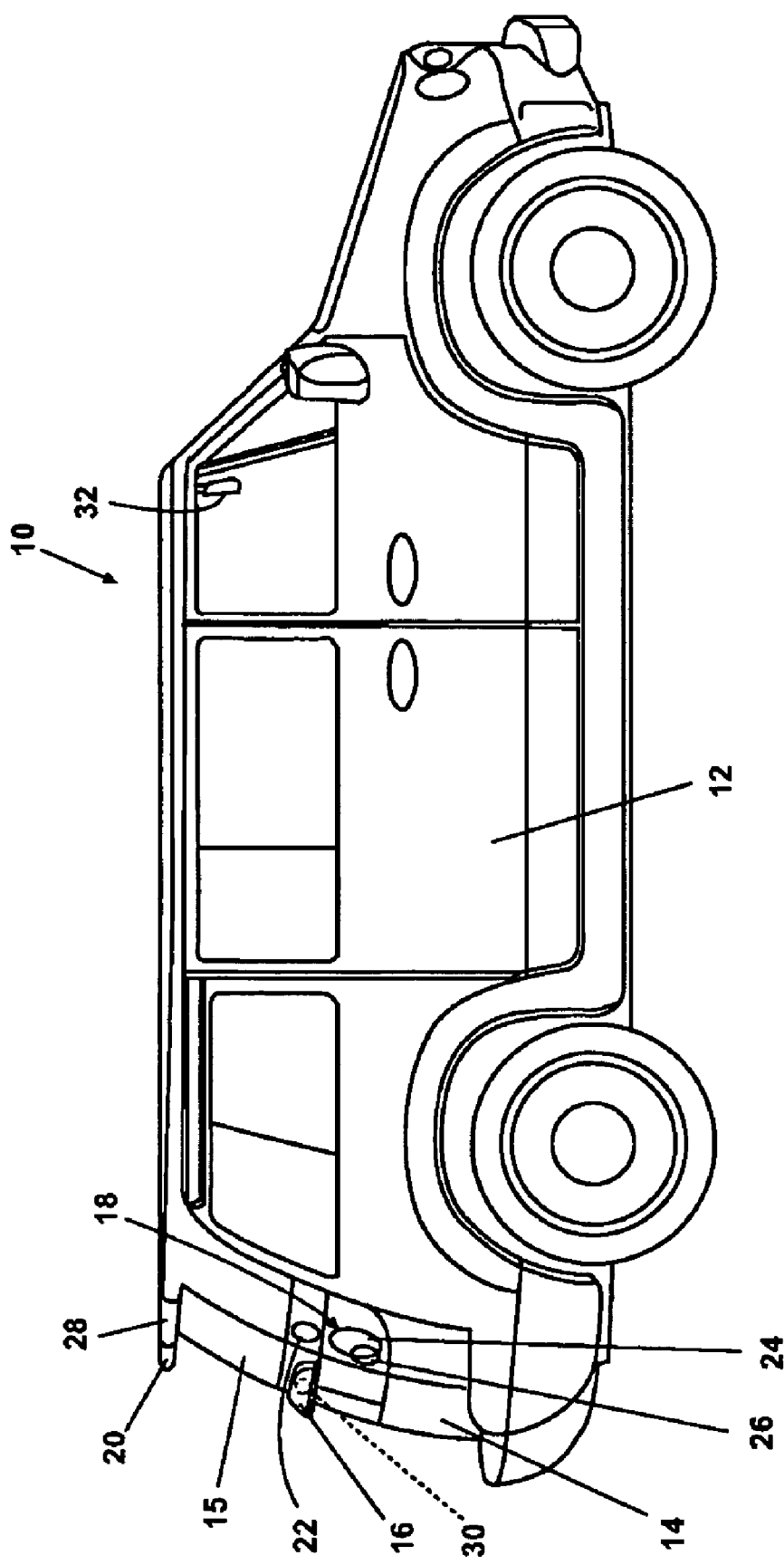
FIG. 1 is a side elevation view of a typical vehicle equipped with a camera and supplemental illumination module according to the invention and having a standard rear lighting system comprising tail lamps, a lightbar, and a CHMSL (center-high mounted stop lamp), wherein the camera and supplemental illumination module is mounted in the lightbar.

As seen in FIG. 1, a vehicle 10, e.g., a minivan shown in the exemplary embodiment of FIG. 1, having side doors 12 and a rear door 14 with a rear window 15 is equipped with rear lighting components, for example a lightbar 16, tail lamps 18, and a center high mount stop lamp (CHMSL) 20. The lightbar 16 is a generally elongated member mounted near the center of the rear door 14 and provides illumination, typically with incandescent light bulbs, to a license plate, a door handle, or other items disposed beneath the lightbar 16. The tail lamps 18 are located on the rear of the vehicle 10 and are horizontally spaced from the rear door 14. In general, the tail lamps 18 provide a visual indication of the motion of the vehicle 10 to pedestrians and other vehicles. For example, the tail lamps 18 can comprise a back-up lamp 22, a brake lamp 24, or a turn signal lamp 26. Back-up lamps 22 are typically white, brake lamps 24 are required to be red, and turn signal lamps 26 can be red or amber. Now required by law to be present on all passenger cars and light trucks, the CHMSL 20 is effectively a brake light mounted on the vertical centerline of the vehicle 10 and no lower than three inches below the rear window 15. The CHMSL 20 can be a standalone lamp or can be integrated into a horizontally extending vehicle body member 28, as in FIG. 1.

Figure 2:
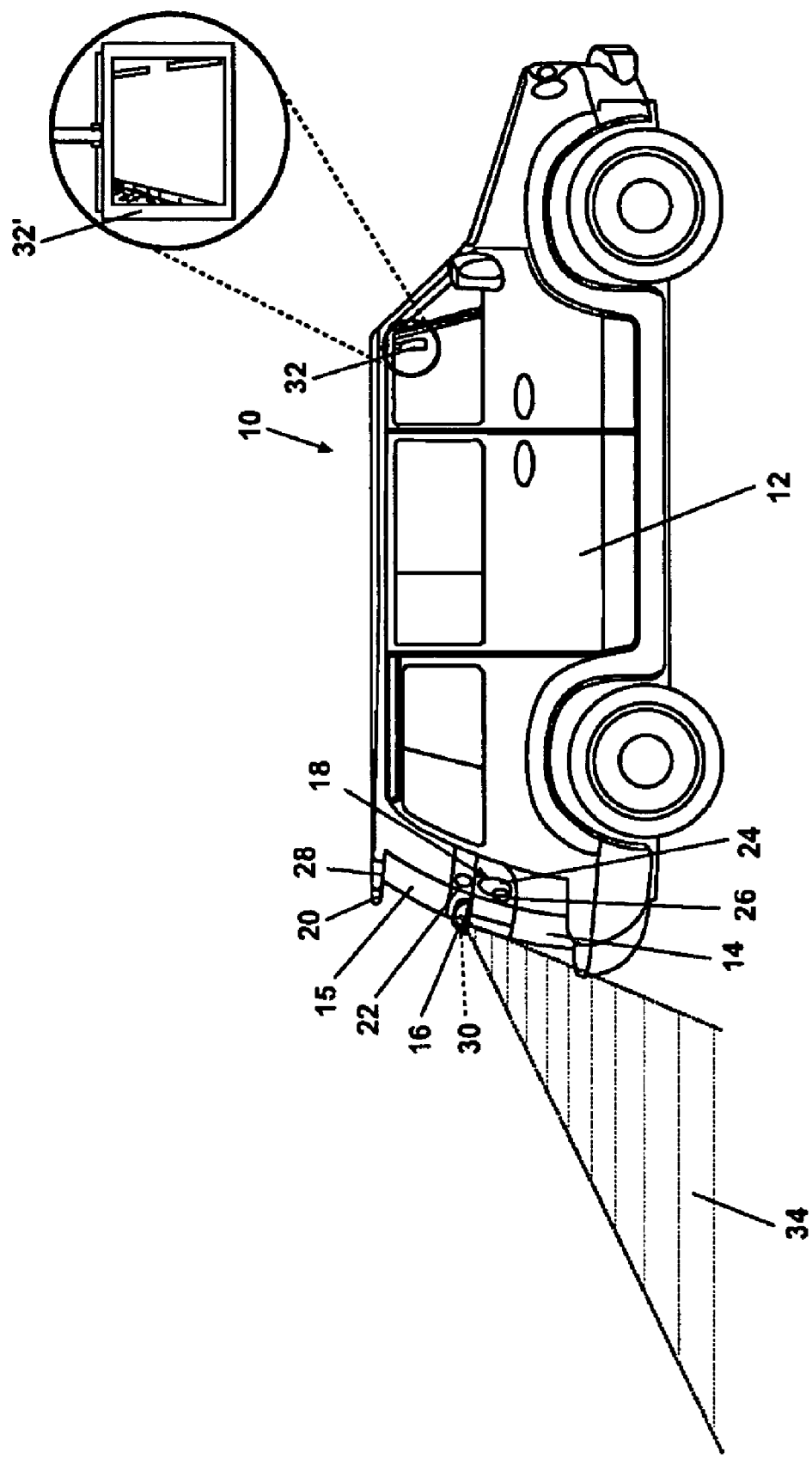
FIG. 2 is a schematic side view of the vehicle in FIG. 1 with the camera and supplemental illumination module activated.
Figure 3:
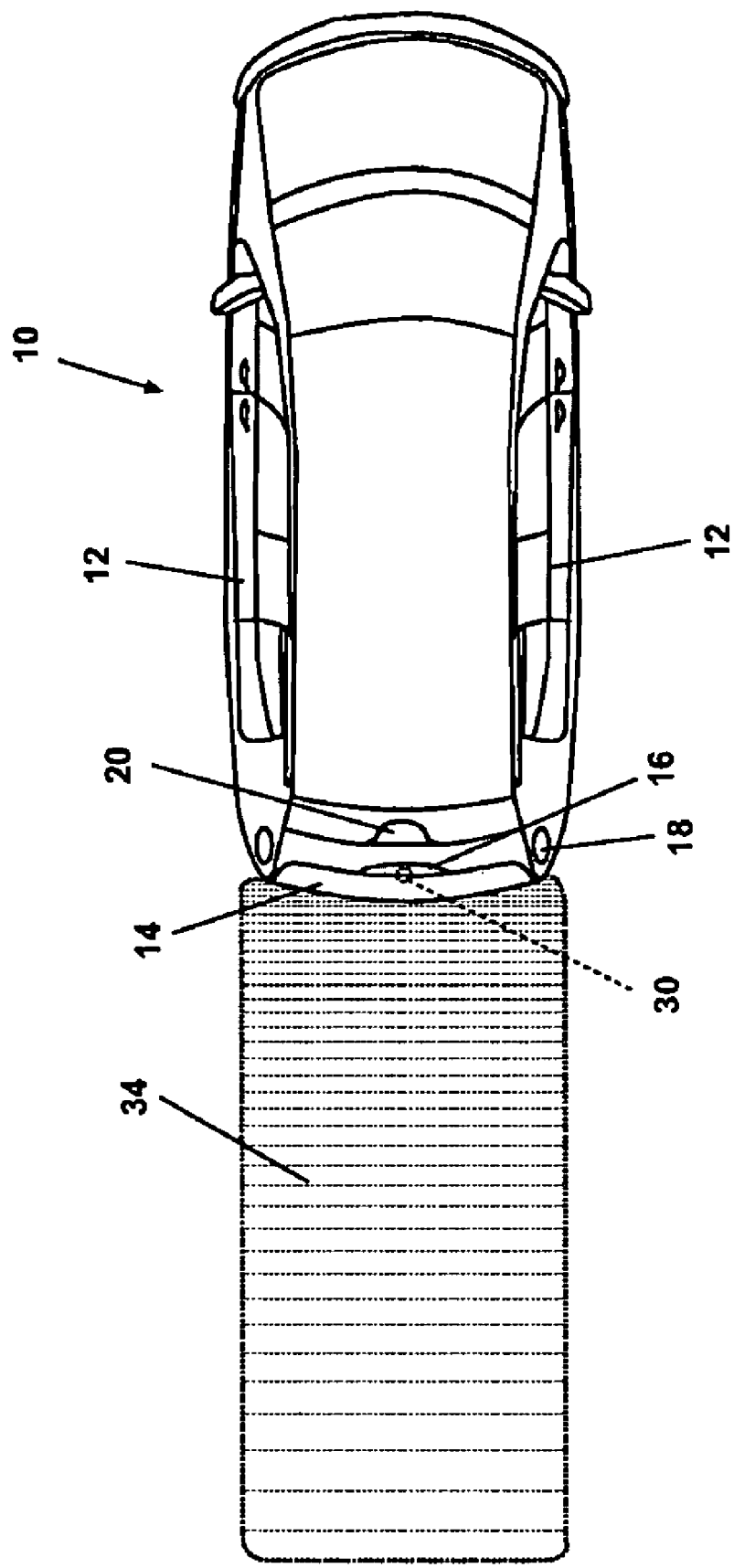
FIG. 3 is a schematic top view of the vehicle in FIG. 2.

The vehicle 10 is further equipped with a camera and supplemental illumination module 30, which includes an imaging system and a supplemental illumination system and will be described in detail hereinafter, mounted by example to the rear surface of the vehicle 10, such as to the lightbar 16. The module 30 is in communication with a display 32, preferably located in the interior of the vehicle 10 near the driver. When activated, the camera and supplemental illumination module 30 distributes light to nearby regions, as shown in FIGS. 2 and 3. For example, the module 30 can illuminate an area 34 immediately behind the vehicle 10 and having a width approximately equal to that of the vehicle 10. The area 34 can extend to a predetermined distance, such as 12 feet or more, for example, behind the vehicle 10, such as when the imaging system described herein is used in a back-up imaging function. With the presence of supplemental illumination, CMOS and other cameras having limited low light sensitivity can capture visible video images, which can be communicated to the display 32 and viewed by the driver in real time.

Figure 4:
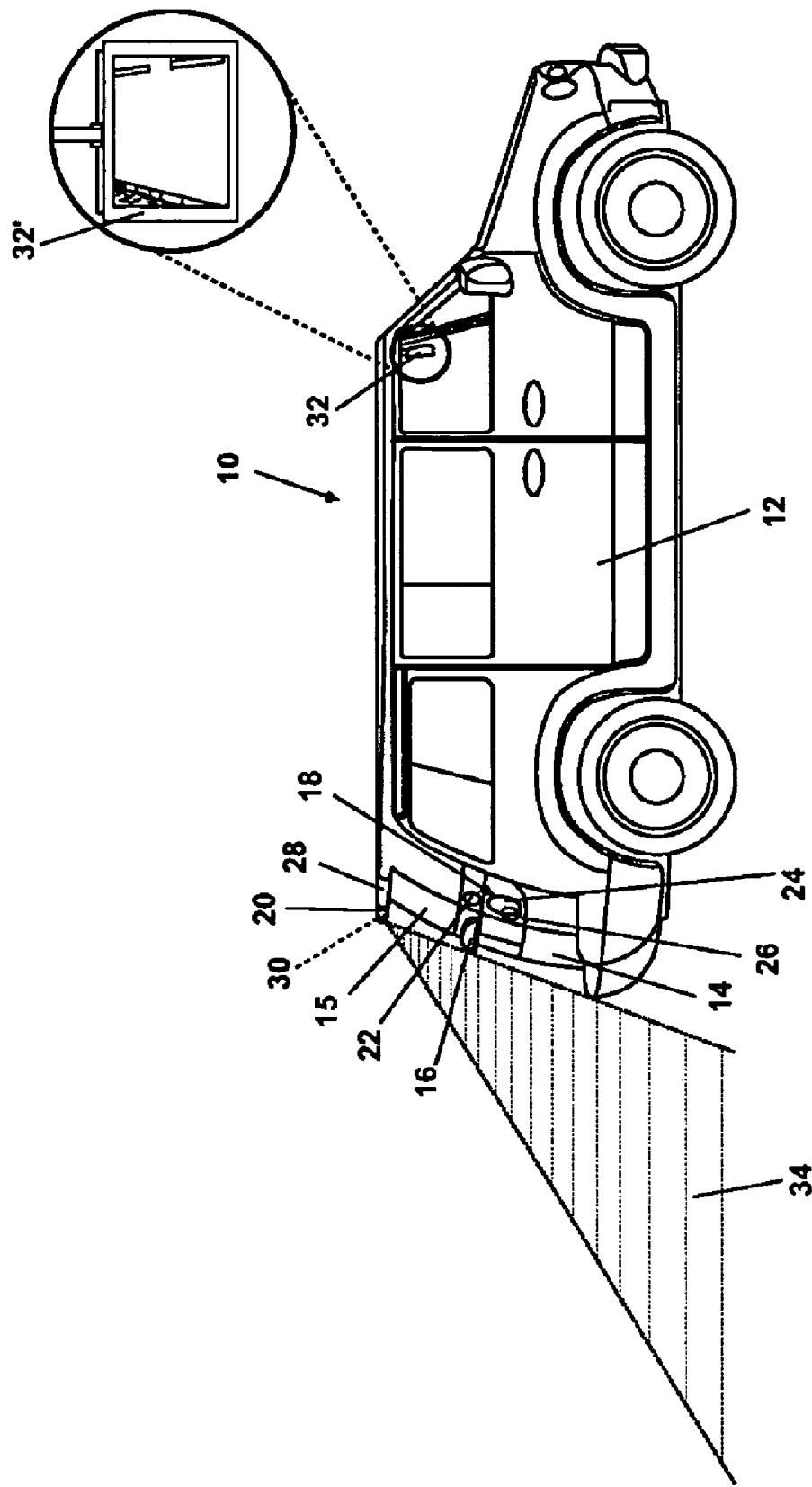
FIG. 4 is a schematic side view of the vehicle in FIG. 1 showing an alternative embodiment with the camera and supplemental illumination module mounted in the CHMSL and activated.
Figure 5:
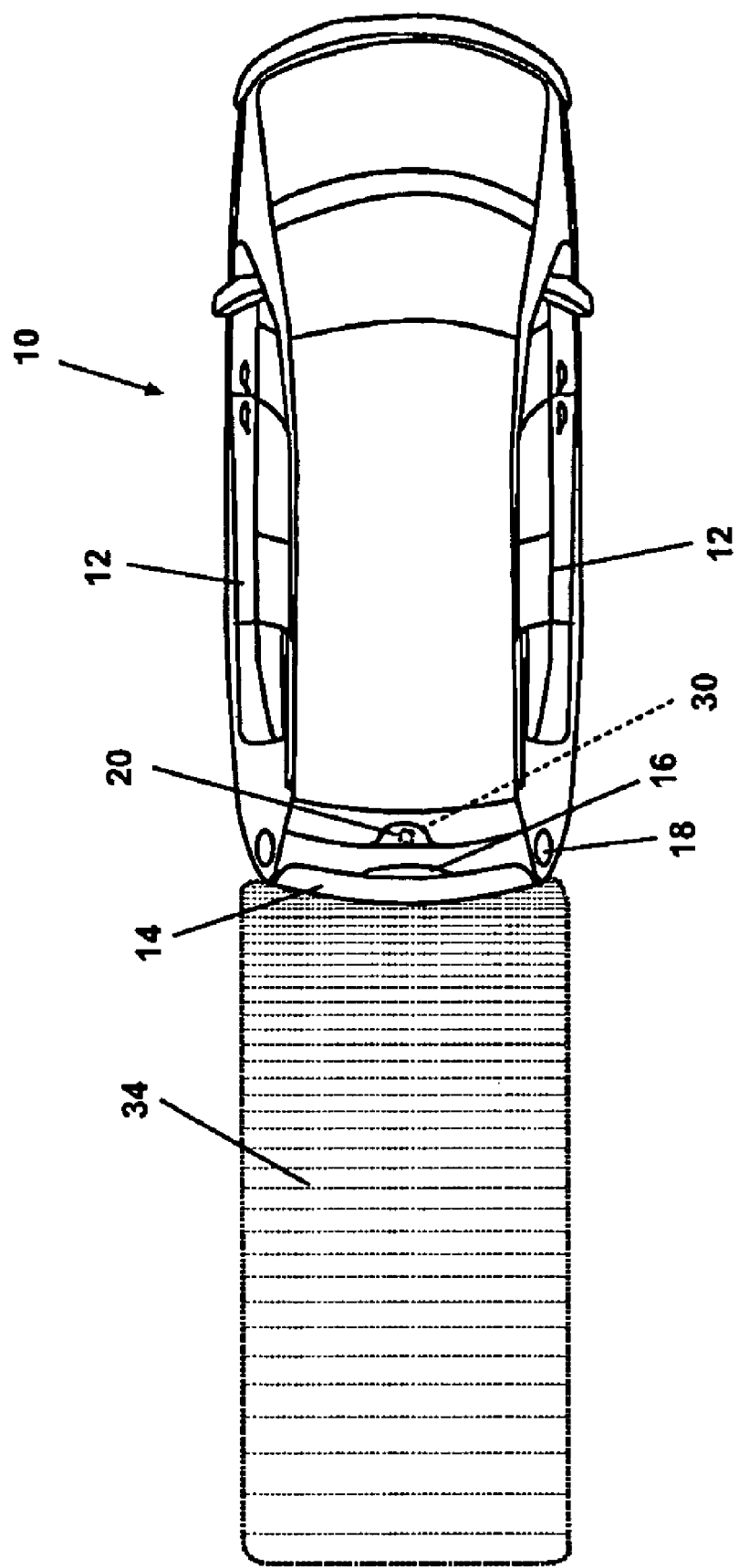
FIG. 5 is a schematic top view of the vehicle in FIG. 4.
Figure 6:
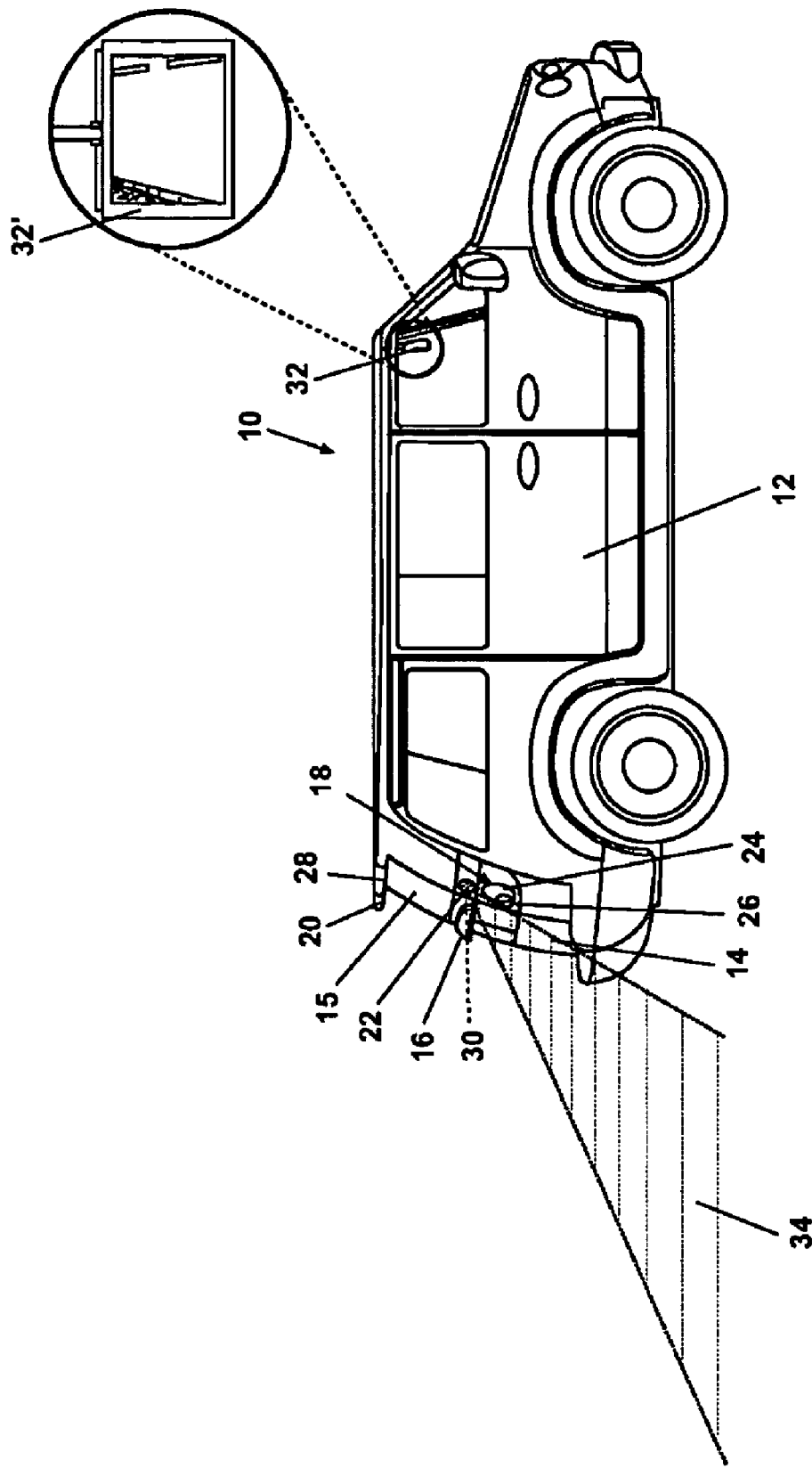
FIG. 6 is a schematic side view of the vehicle in FIG. 1 showing another alternative embodiment with the camera and supplemental illumination module mounted in the tail lamps and activated.
Figure 7:
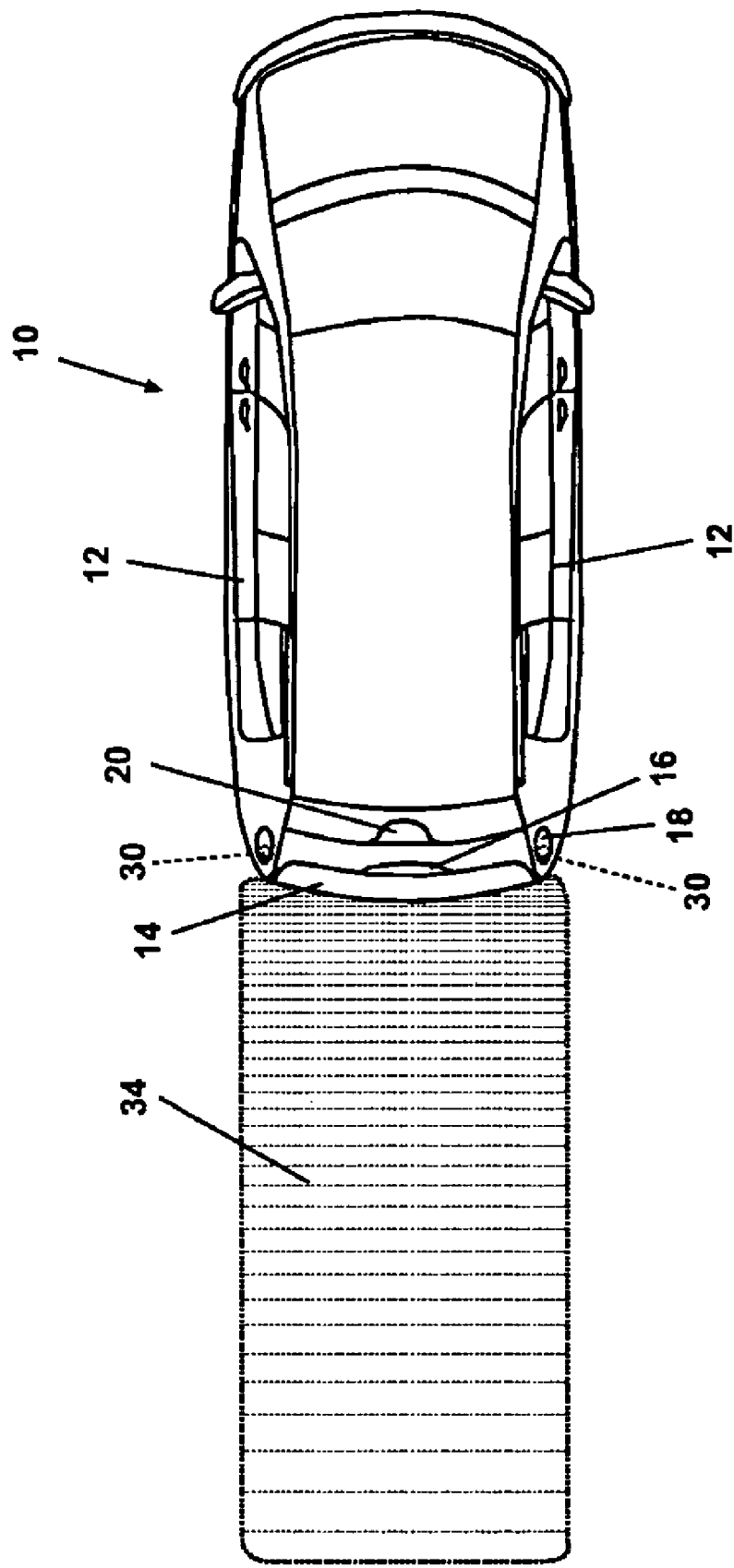
FIG. 7 is a schematic top view of the vehicle in FIG. 6.

The camera and supplemental illumination module 30 can alternatively be located elsewhere on the vehicle 10. For example, the module 30 can be positioned in the CHMSL 20, as depicted in FIGS. 4 and 5. In this case, the CHMSL 20 is mounted above the rear window 15, which provides a different, smaller viewing angle for the camera and supplemental illumination module 30. With some cameras and imaging devices, a smaller viewing angle can relate to a reduction in visual distortion of the corresponding images provided on the display 32. Similar to when the module 30 is mounted in the lightbar 16, the camera and supplemental illumination module 30 supplies light to nearby regions, for example the area 34 covering approximately the width of the vehicle 10 and 12 feet behind the vehicle 10. Alternatively, the module 30 can be positioned in any portion of the tail lamps 18, for example in the back-up lamp 22 as shown in FIGS. 6 and 7. Again, when activated, the camera and supplemental illumination module 30 supplies light to nearby regions, such as the area 34 immediately behind the vehicle 10 and covering approximately the width of the vehicle 10. The area 34 can extend to a predetermined distance, such as 12 feet, for example, behind the vehicle 10, such as when the imaging system described herein is used in a back-up imaging function. The approximate relative size shown for the illumination areas 34 in FIGS. 2-7 are only exemplary and other sizes and general shapes of areas can be illuminated, depending on the requirements of the imaging system of the camera and supplemental illumination module 30. Other potential locations for mounting the camera and supplemental illumination module 30 include an external mirror, a door handle, a spoiler, or other decorative vehicular trim items.

As stated above, the camera and supplemental illumination module 30 comprises an imaging system and a supplemental illumination system. As depicted in FIGS. 8-12, the imaging system comprises a camera 36, preferably a CMOS camera, and the supplemental illumination system comprises at least one light source 38. When two light sources 38 are utilized, it is preferred that the camera 36 is positioned between the light sources 38. The camera 36 and the light source 38 are mounted in an upper housing 40 and a lower housing 42. The upper housing 40 or, alternatively, the lower housing 42 is in communication with an electrical connection 50 that can provide power to the camera 36 and the light source 38 and can provide communication between the module 30, its control circuit, and the display 32 and/or between the module 30 and control circuits for the lightbar 16, the tail lamps 18, the CHMSL 20, or other rear lighting components. The lower housing 42 comprises a bezel 44 and a lens 46, and a light wall 47 to reflect light outward through the preferably clear lens 46, to separate the light source 42 from the camera 36, and to maintain the camera 36 at an angle. Additionally, a seal, such as a gasket 48, extends along the periphery between the upper and lower housings 40 and 42 to prevent ingress of moisture, dust, debris, or any other material detrimental to the performance of the camera and supplemental illumination module 30.

Figure 8:
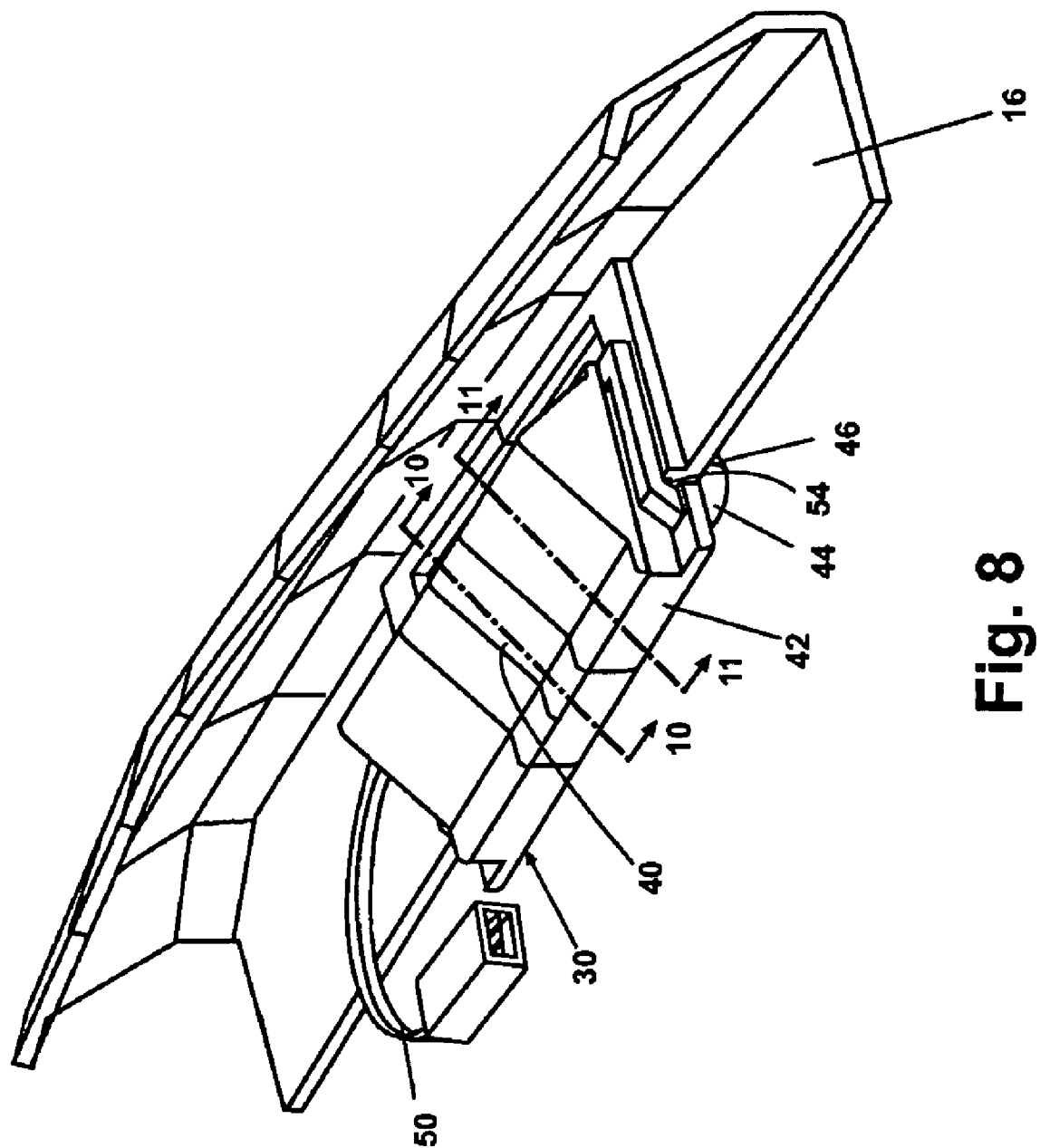
FIG. 8 is a perspective view of a camera and supplemental illumination module according to the invention mounted to a lightbar.
Figure 9:
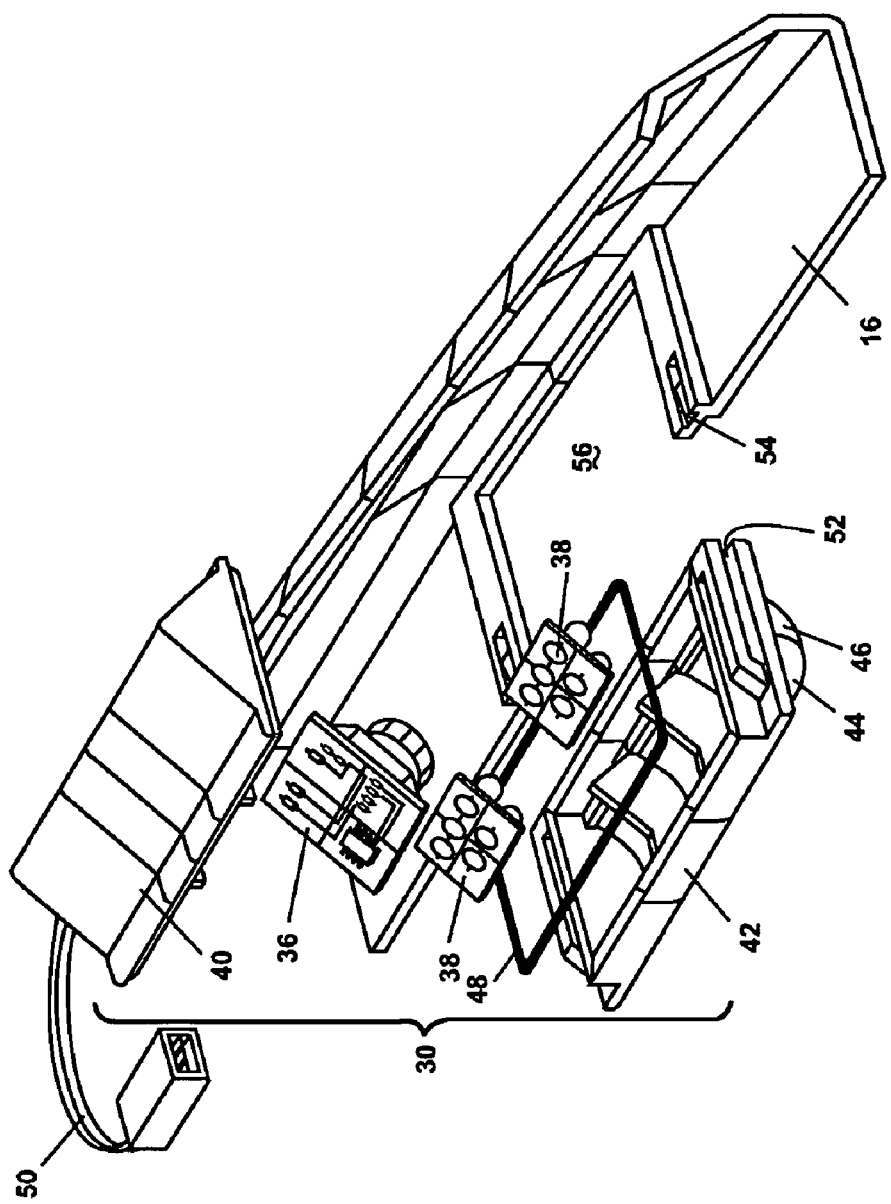
FIG. 9 is an exploded view of the camera and supplemental illumination module and the lightbar in FIG. 8.
Figure 10:
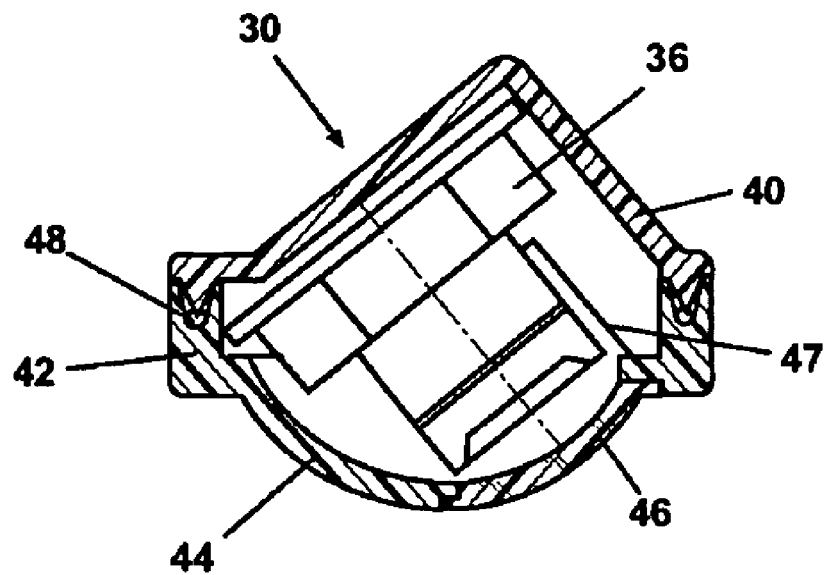
FIG. 10 is a sectional view of the camera and supplemental illumination module taken along line 10-10 of FIG. 8.
Figure 11:
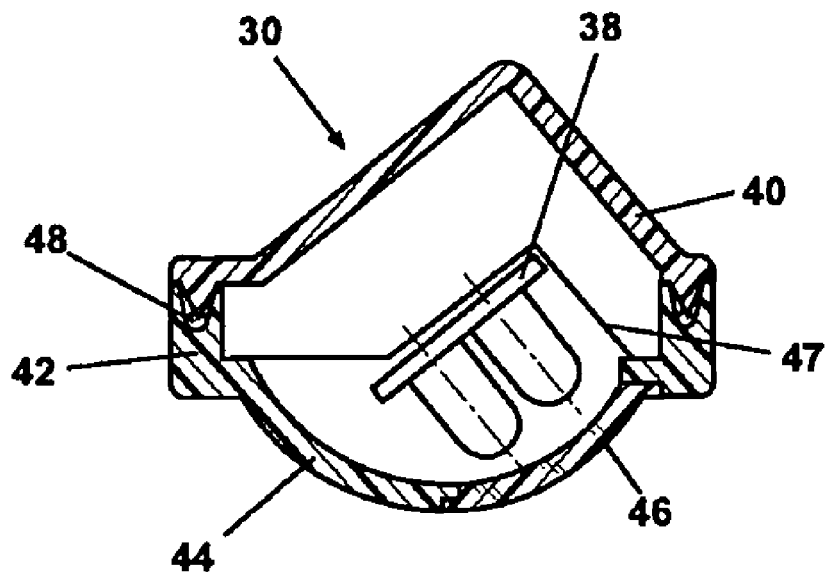
FIG. 11 is a sectional view of the camera and supplemental illumination module taken along line 11-11 of FIG. 8.

The lower housing 42 or, alternatively, the upper housing 40 further comprises means for mounting the module 30 to the lightbar 16, tail lamps 18, CHMSL 20, or other suitable vehicle component. For example, in the case where the module 30 is mounted to a lightbar 16, as shown in FIGS. 8-9, the lower housing 42 can comprise grooves 52, one formed on each side thereof, that receive flanges 54 disposed on the sides of a module cavity 56 formed by the lightbar 16 and sized to receive the module 30.

Figure 12:
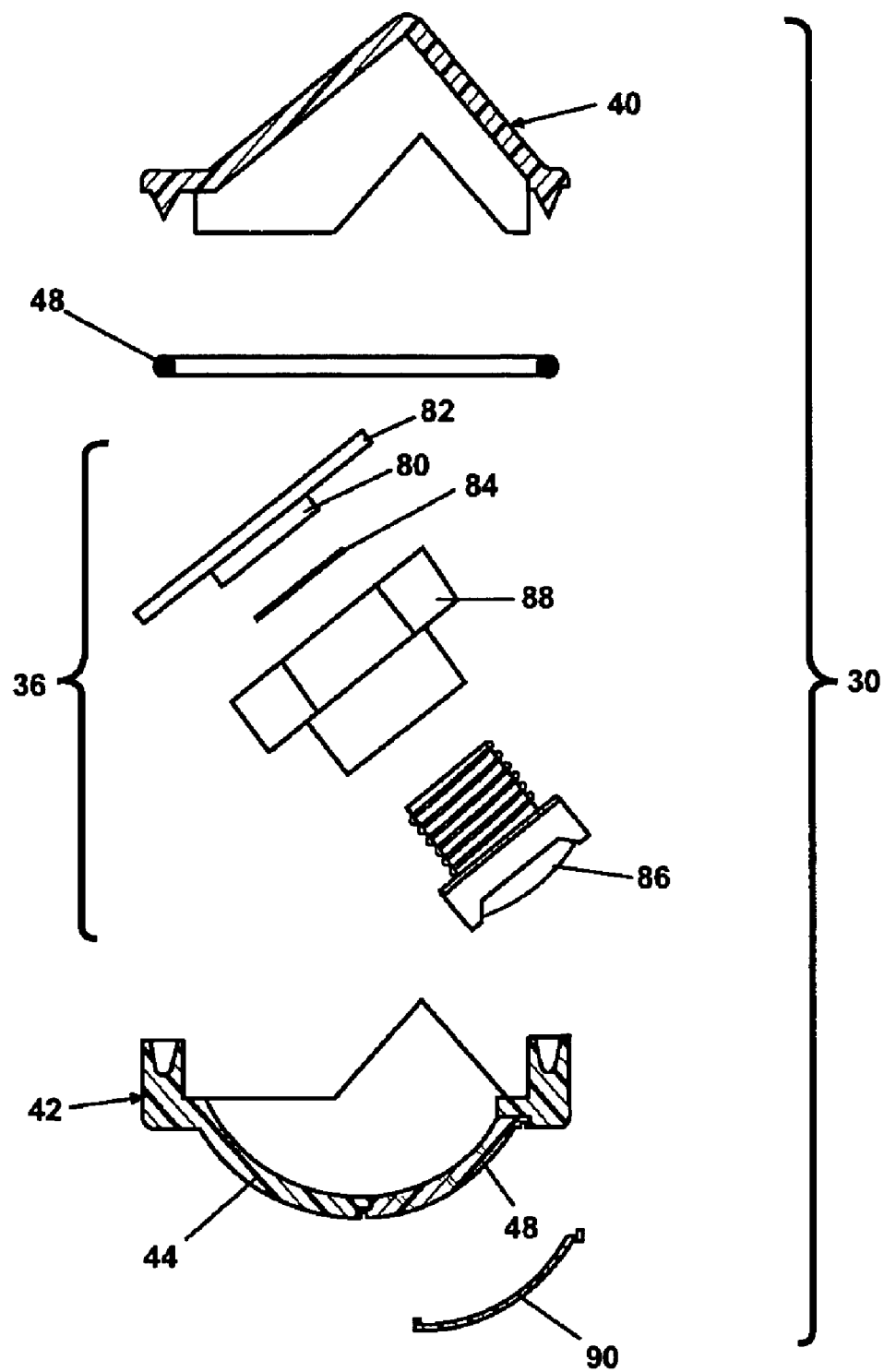
FIG. 12 is an exploded view of FIG. 10.

Referring particularly to FIG. 12, the camera 36 comprises an image sensor 80 mounted to a printed circuit board 82, which is in communication with the electrical connection 50. Preferably, the image sensor 80 includes at least one glass element 84 laminated thereto to protect the image sensor 80 from contamination. The camera 36 further comprises a camera lens 86 positioned in front of the image sensor 80. The camera lens 86 is made of at least one and optionally several concave and/or convex glass and/or plastic elements. These shaped elements, as known to one skilled in the lens art, determine the optical properties of the camera lens 86 and can be engineered to optimize characteristics of the lens, such as field of view and percent distortion. A lens holder 88 houses the printed circuit board 82, the image sensor 80, and the camera lens 86 in a compact configuration.

The image sensor 80 can comprise any suitable sensor for acquiring and converting image data. Preferably, the image sensor 80 is a complimentary metal oxide semiconductor (CMOS) sensor, which can be manufactured with conventional semiconductor fabrication processes and equipment. Cameras having CMOS image sensors are generally smaller than other comparative cameras, but they typically have low light sensitivity. Another example of an image sensor 80 is a charge-coupled device (CCD) sensor, which is more expensive than a CMOS sensor but is a high-quality sensor in terms of fidelity and light sensitivity. Although a CMOS camera is shown and discussed herein as a preferred embodiment, it will be understood that any other camera, including a CCD camera, or other suitable imaging device can be employed without departing from the scope of this invention.

As discussed in the background of the invention, IR radiation, which is present in sunlight and in certain types of artificial light, is typically undesirable for imaging in normal daylight conditions because it tends to wash out colors and renders the images unclear. Conversely, when ambient light levels are low, such as during the night or on cloudy days, supplemental lighting in the near-IR or IR range is particularly effective in illuminating the camera viewing area with a wavelength that the sensor technology is very efficient with. To this end, the vehicular imaging system comprises an IR filter disposed in an optical path of the image sensor 80.

The IR filter is preferably photochromic so that the amount of IR radiation it attenuates alters according to the intensity of ultraviolet (UV) radiation in its vicinity. When the UV ray intensity is below a predetermined value, or when UV rays are substantially absent, the IR filter transmits IR radiation, thereby exposing the image sensor 80 to IR illumination, such as illumination from supplementary IR light sources. On the other hand, when the UV ray intensity exceeds the predetermined value, such as in normal daylight conditions, the IR filter transmits visible light and significantly attenuates the IR radiation to thereby prevent the IR rays from negatively affecting the images acquired by the image sensor 80. Further, the degree to which IR radiation is filtered can vary with the intensity of the UV rays; as UV radiation increases, IR radiation attenuation increases. Because of its photochromic behavior, the IR filter automatically activates when needed and does not require manual manipulation by a user.

The IR radiation attenuated by the active IR filter can lie within a suitable range of the electromagnetic (EM) spectrum. In general, the IR range in the EM spectrum is the wavelengths between red light and microwaves. The attenuated IR radiation can include near-IR radiation, which is a portion of the EM spectrum near red wavelengths. An exemplary range of IR filtration is wavelengths between about 700 nm and 1 mm.

The IR filter comprises a photochromic material and is preferably applied to the camera and supplemental illumination module 30 and any components thereof in the form of a coating. The coating comprises at least one layer having a thickness, variable or uniform, that effects the desired filtering characteristics. An exemplary IR filter material is disclosed in U.S. Pat. No. 4,069,168, which is incorporated herein by reference in its entirety. This material includes tungsten hexacarbonyl, which acts as a photochromic agent and an infrared absorber. The tungsten hexacarbonyl is incorporated in liquid allyl glycol carbonates and polymerizates thereof. Other materials exhibiting photochromic IR filtering characteristics can be utilized without departing from the scope of the invention. The exemplary material cited above is not intended to limit the invention in any manner. The IR filter coating can be applied to vehicular imaging system in any suitable manner and with any appropriate coating process.

The IR filter coating can be applied to several locations in and on the camera and supplemental illumination module 30. The number of IR filter coatings and the quantity thereof can vary according to desired optical properties. The IR filter coating can be incorporated into the camera 36 and/or the lower housing 42. Exemplary locations include, but are not limited to, directly on the image sensor 80 (i.e. between the image sensor 80 and the glass element 84) or on the glass element 84. Alternatively, a second piece of glass (not shown) can be laminated to the glass element 84, and the IR filter coating can be applied to the second piece of glass. Further, the IR filter coating can be disposed on an element of the camera lens 86. For example, the IR filter coating can be applied to the outermost element of the camera lens 86, where it would ensure a good photochromic response and be sufficiently exposed to a light source. When the camera lens 86 comprises more than one element, the IR filter coating can be deposited on the surface of any element and between adjacent elements. The IR filter coating can optionally be applied to an inner or outer surface of the lens 46 in the lower housing 42. Alternatively, the entire lower housing 42 can be made of a clear plastic material, and the IR filter coating can be deposited thereon. Optionally, the camera and supplemental illumination module 30 can comprise a separate glass piece 90, as shown in FIG. 5, that is mounted to the lower housing 42 and serves as a substrate for the IR filter coating.

The light source 38 is preferably a small, low power device, such as a light emitting diode (LED). Furthermore, the LEDs for supplying illumination for the camera 36 are preferably white so that the image on the display 32 is a true representation of the viewing area of the camera 36. Additionally, the white light sources 38 can be multi-functional and also serve to illuminate the region near the license plate when mounted in the lightbar 16, as a back-up lamp when mounted in the tail lamps 18, or as a task and/or security light to illuminate the adjacent vehicle environment. Alternatively, the LEDs can be infrared LEDs for use in low light conditions, and it is within the scope of the invention to employ another suitable source of illumination, such as organic LEDs (OLEDs) or incandescent or fluorescent light bulbs.

When the camera and supplemental illumination module 30 contains more than one light source 38, a portion of the light sources 38 can be colored for other functionalities. For example, if the module 30 is mounted in the tail lamps 18, the light source 28 can be red or amber and act as a brake light or a turn signal lamp. Additionally, a red light source 28 mounted in the CHMSL 20 can operate as a brake light. Provided that the lens 46 is clear, various combinations of colored light sources 38 can be assembled to create multifunctional camera and supplemental illumination modules 30. For example, with a transparent and/or translucent light lens/filter/diffuser 46, a plurality of red light emitting diodes can be provided for brake lamp functions, and a plurality of white light emitting diodes can be provided for both the back-up function as well as the supplemental illumination function for the imaging system described by example herein.

To assemble the camera and supplemental illumination module 30, the camera 36 and the light source 38 are positioned in the upper housing 40 and are operably coupled with the electrical connection 50. Next, the upper housing 40 is mounted to the lower housing 42 (preferably in a sealed watertight manner), and the assembled module 30 is then mounted to the desired location in the vehicle 10. For example, when the module 30 is part of the lightbar 16, the module 30 is positioned adjacent to the module cavity 56 in the lightbar 16, the grooves 52 are aligned with the flanges 54, and the module is slid onto the flanges 54 and into the module cavity 56.

Figure 13:
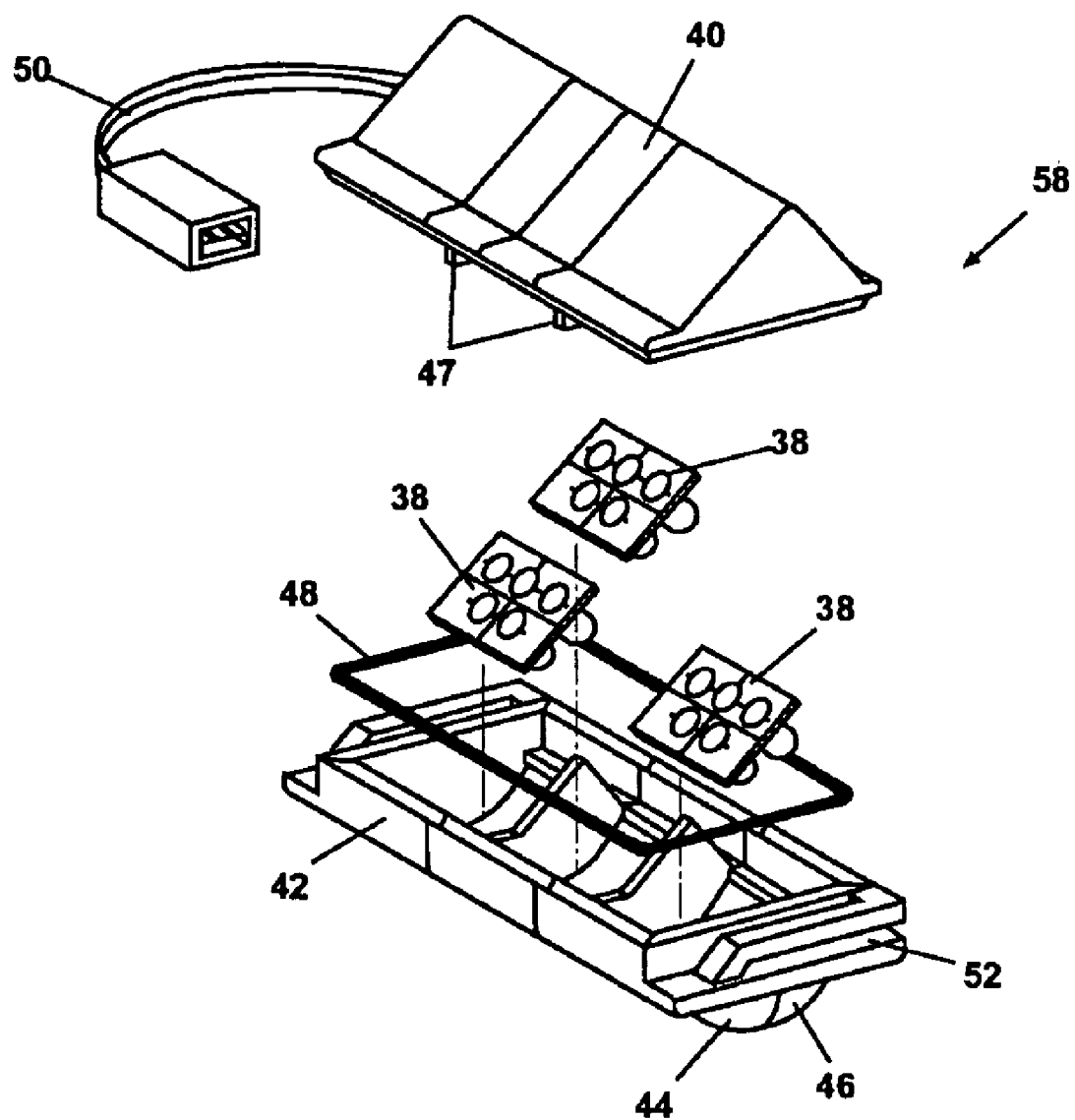
FIG. 13 is an exploded view of a supplemental illumination module according to the invention.

An alternative embodiment is shown in FIG. 13, where like objects are identified with like reference numerals. These figures illustrate a supplemental illumination module 58 that is identical to the camera and supplemental illumination module 30 except that the supplemental illumination module 58 does not contain the camera 36. The supplemental illumination module 58 can contain any number of light sources 38 and can be mounted in any of the locations described herein for the camera and supplemental illumination module 30.

Figure 14:
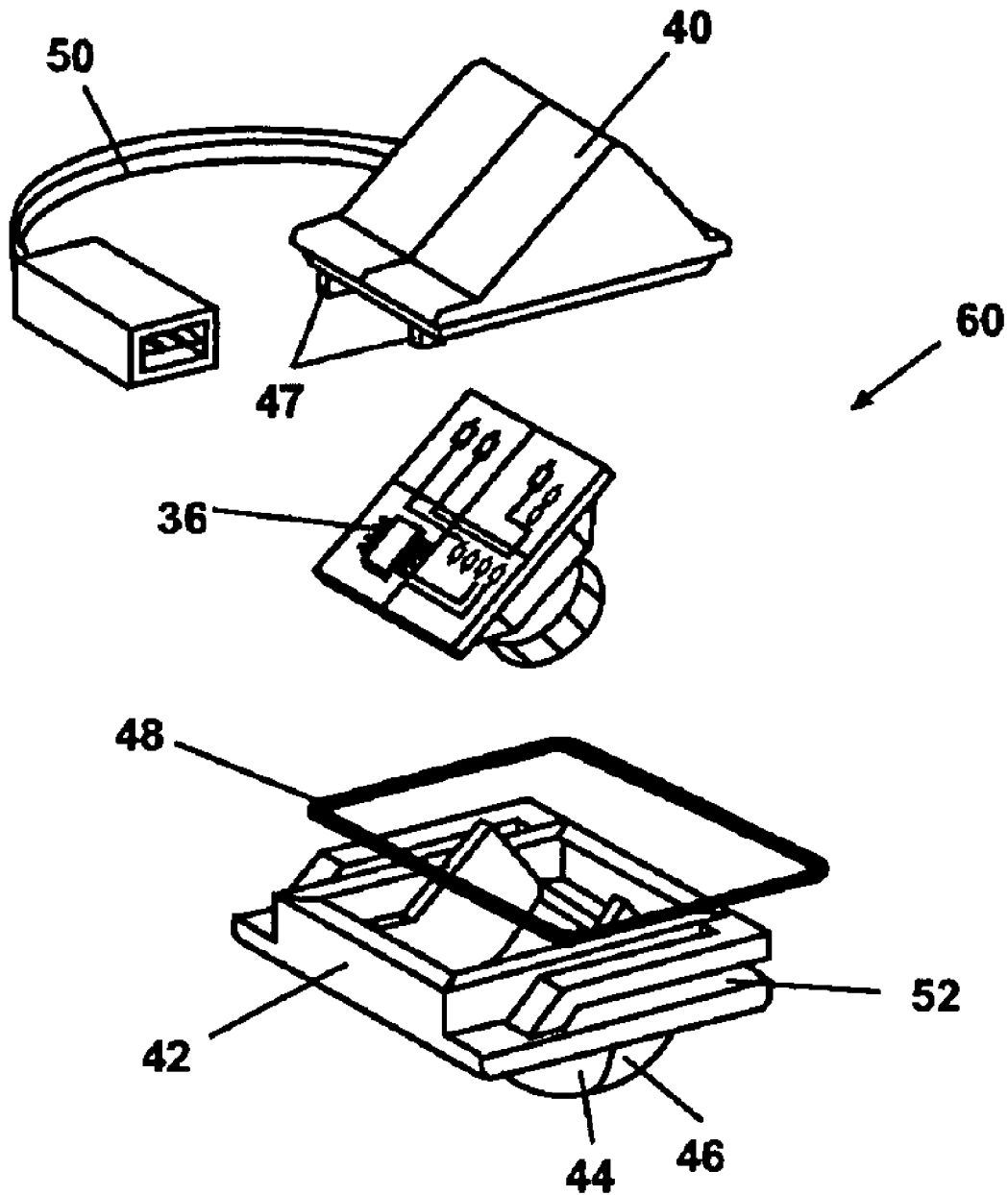
FIG. 14 is an exploded view of a camera module according to the invention.

Similarly, another alternative embodiment of the invention is shown in FIG. 14, where like objects are identified with like reference numerals. In this case, the module is a camera module 60 that is identical to the camera and supplemental illumination module 30 but does not comprise the light sources 38. The camera module 60 likewise can be positioned in any of the locations described above for the camera and supplemental illumination module 30. The camera module 60 can be sized to be mounted in locations that perhaps are not capable of housing an entire camera and supplemental illumination module 30.

Another alternative embodiment is illustrated in FIGS. 15-18, where like objects are identified with the same reference numeral bearing a prime symbol ('). The embodiment shown in FIGS. 15-18 is a camera module 60' comprising a camera 36' and an IR filter 70 in the form of a movable element that can be selectively removed from the optical path of the camera 36' during low light conditions. The IR filter 70 is preferably a very thin element or a coating applied to a very thin element so that the focal length of the camera 36 does not substantially change as the IR filter 70 moves out of the optical path. As in the first embodiment, the IR radiation attenuated by the IR filter 70 can lie within a suitable range of the electromagnetic (EM) spectrum. In general, the IR range in the EM spectrum is the wavelengths between red light and microwaves. The attenuated IR radiation can include near-IR radiation, which is a portion of the EM spectrum near red wavelengths. An exemplary range of IR filtration is wavelengths between about 700 nm and 1 mm.

The camera 36 is mounted within a front housing 40' and a rear housing 42', and, as in the previous embodiments, the front housing 40' or, alternatively, the rear housing 42' is in communication with an electrical connection (not shown) that can provide power to the camera 36' and communication between the camera module 60', its control circuit, and the display 32 and/or between the camera module 60' and control circuits for the lightbar 16, the tail lamps 18, the CHMSL 20, or other rear lighting components. A seal, such as a gasket 48', extends along the periphery between the front and rear housings 40' and 42' to prevent ingress of moisture, dust, debris, or any other material detrimental to the performance of the camera 36.

The camera 36' comprises an image sensor 80' mounted to a printed circuit board 82', which is in communication with the electrical connection. The camera 36' further comprises a camera lens 86' positioned in front of the image sensor 80'. The camera lens 86' is made of at least one and optionally several concave and/or convex glass and/or plastic elements. These shaped elements, as known to one skilled in the lens art, determine the optical properties of the camera lens 86' and can be engineered to optimize characteristics of the camera lens 86', such as field of view and percent distortion. A lens holder 88' supports the camera lens 86' and mounts the camera lens 86' to the rear housing 42'. The lens holder 88' defines a center aperture 89 axially aligned with the camera lens 86' and the with the image sensor 80'. The optical path of the image sensor 80' extends from the image sensor 80', through the center aperture 89 of the lens holder 88', through the camera lens 86', and through the front housing 40' to the environment external of the camera module 60', as indicated by an arrow in FIG. 18.

Figure 15:
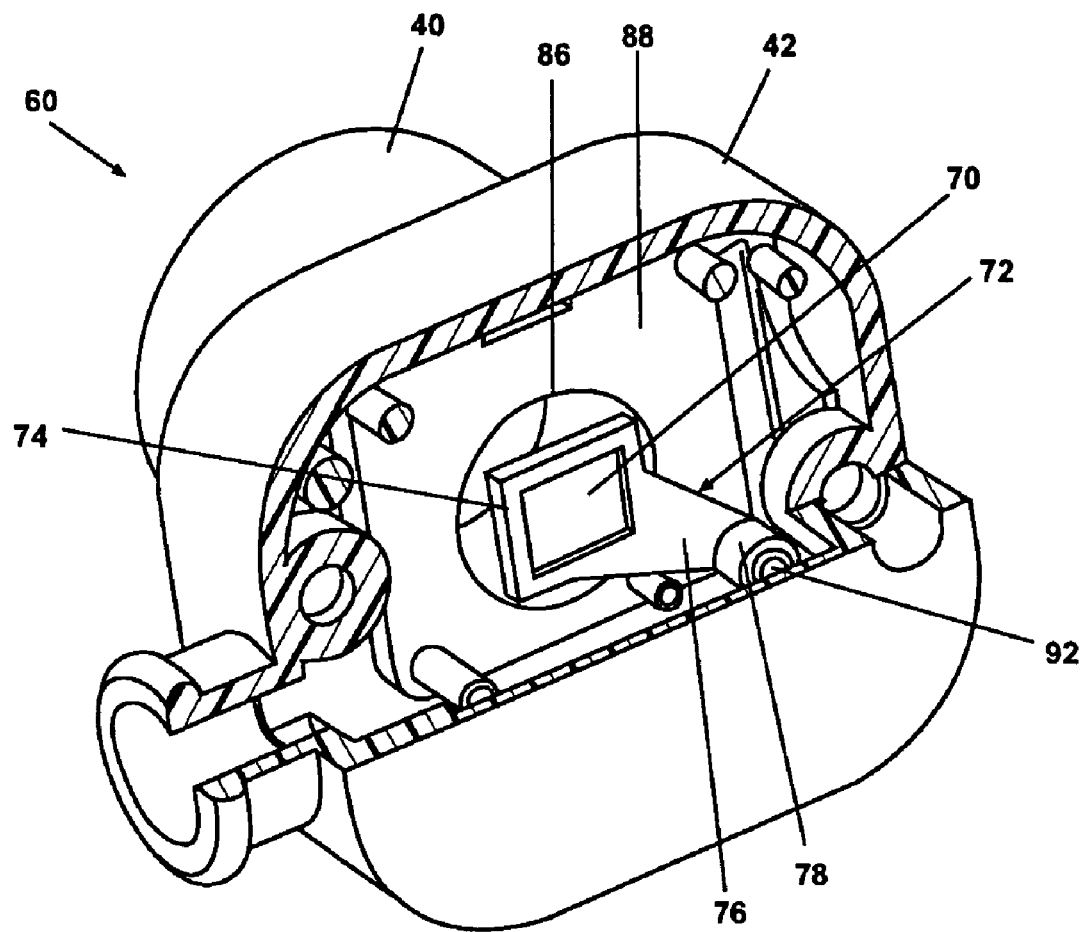
FIG. 15 is a perspective view of an alternative camera module according to the invention, wherein an infrared filter is in a first position.
Figure 16:
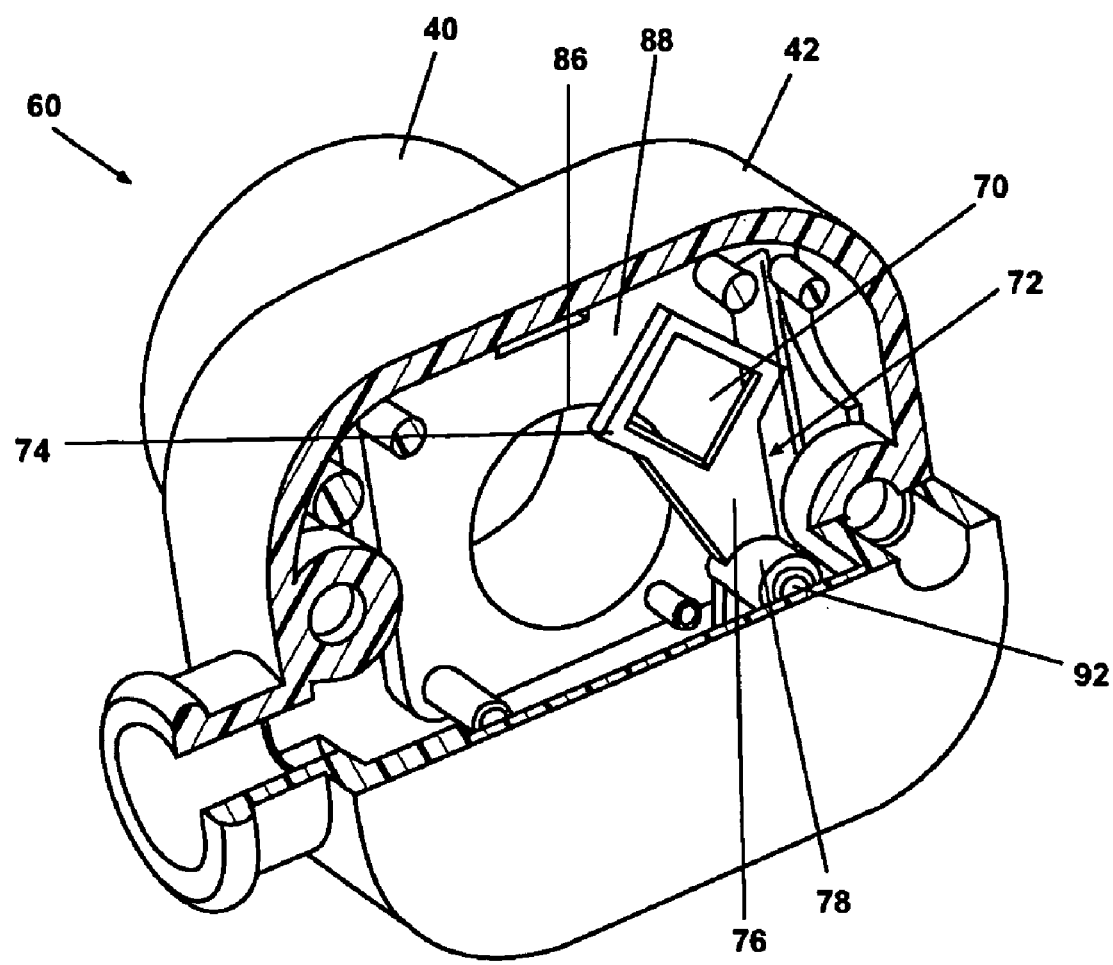
FIG. 16 is a perspective view the camera module of FIG. 15, wherein the infrared filter is in a second position.
Figure 17:
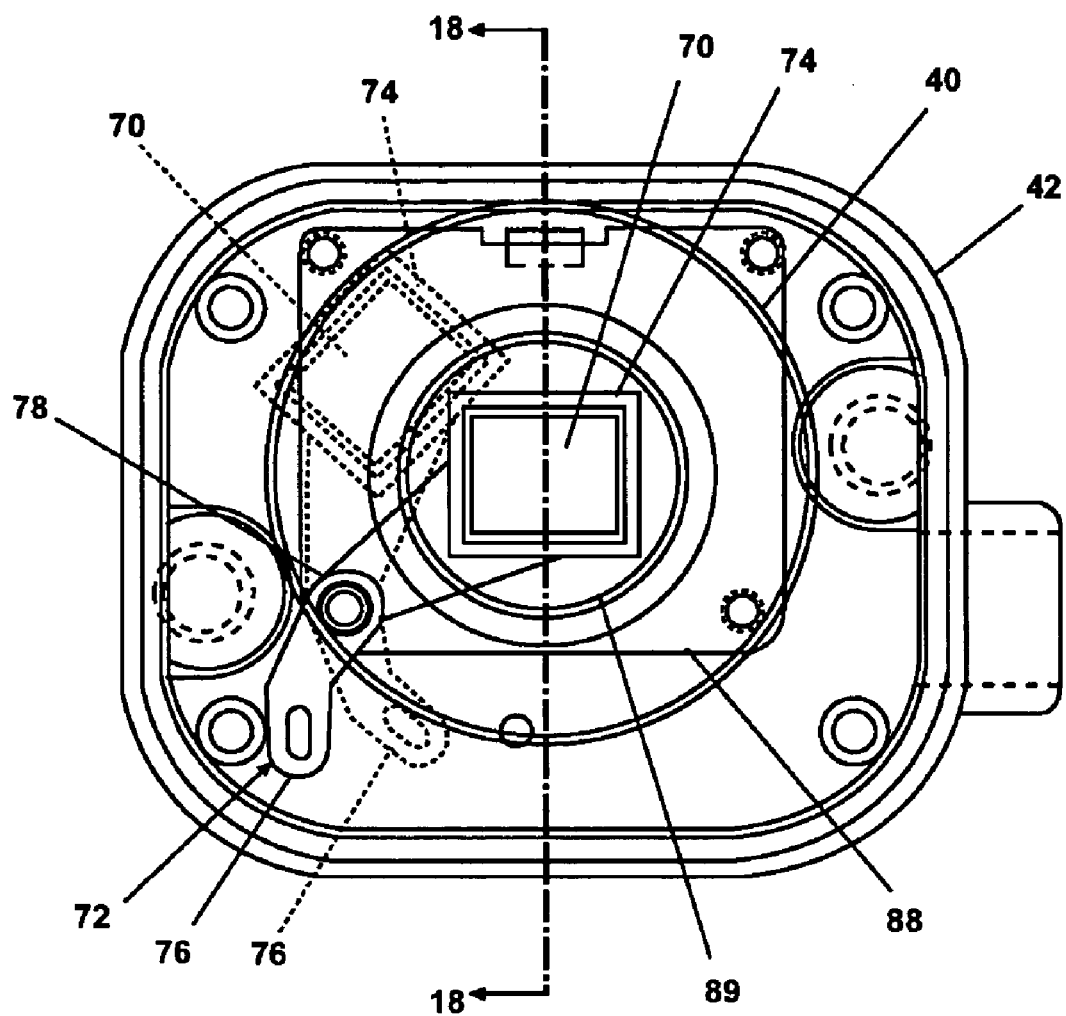
FIG. 17 is a front view of the camera module of FIG. 15, wherein a front housing is shown as partially transparent to illustrate the interior of the camera module.
Figure 18:
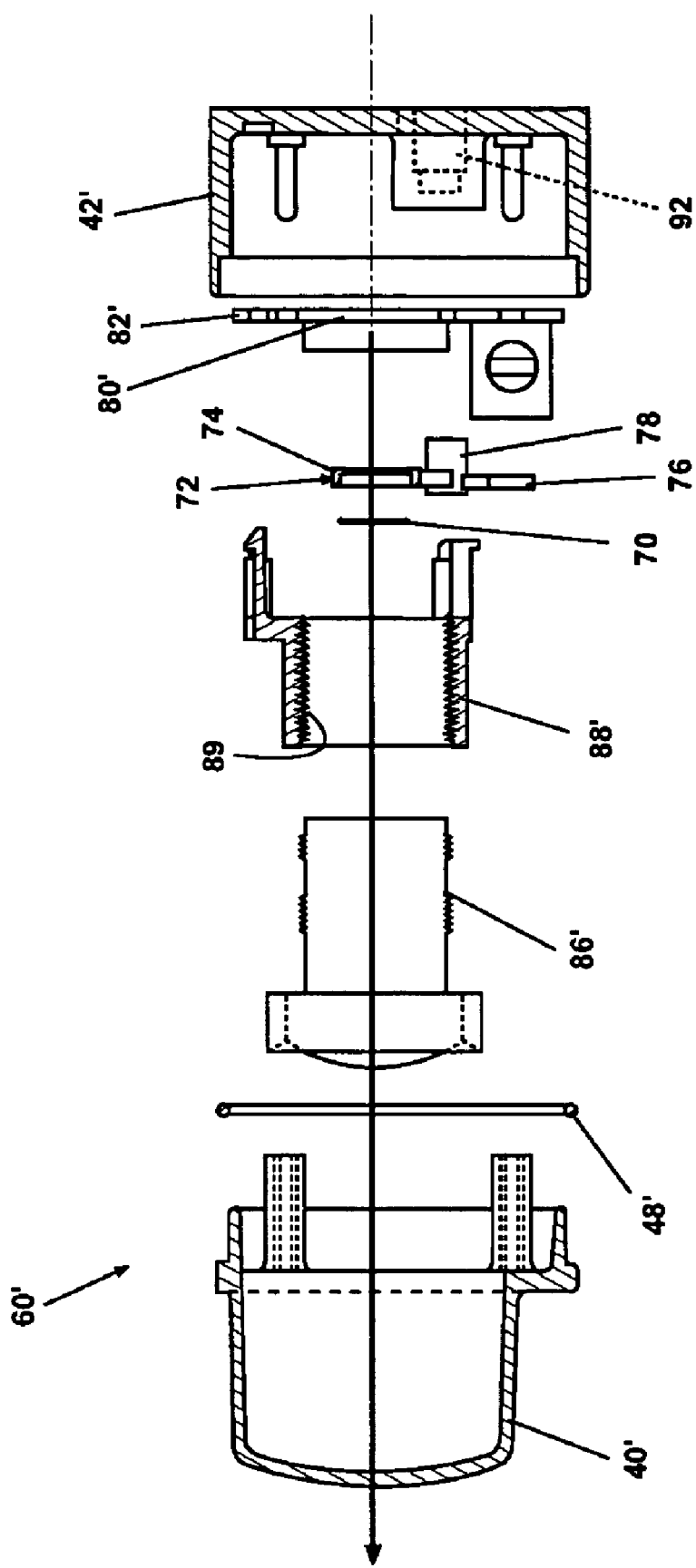
FIG. 18 is an exploded sectional view taken along line 18-18 of FIG. 17.

The camera module 60' further comprises an IR filter holder 72 with a terminal frame 74 sized to receive the IR filter 70. The frame 74 is disposed at the end of a support arm 76 having a pivot point in the form of a cylindrical boss 78. As shown in FIGS. 15-17, the IR filter holder 72 can pivot about the boss 78 and relative to the lens holder 88' and to the printed circuit board 82' to move the IR filter 70 between a first position, as seen in FIG. 15, wherein the IR filter 70 is aligned with the center aperture 89 and in the optical path of the image sensor 80' to prevent transmission of IR wavelengths to the image sensor 80', and a second position, as shown in FIG. 16, wherein the IR filter 70 is spaced from the center aperture 89 and, thus, removed from the optical path of the image sensor 80' so that the image sensor 80' can receive IR radiation.

The camera module 60' includes a mechanism for automatically inducing the movement of the IR filter holder 72. In this embodiment, the mechanism is a solenoid 92 mounted to the rear housing 42' and in operative communication with the boss 78. Preferably, the solenoid 92 is in a non-powered state when the IR filter 70 is in the first position during daylight and bright conditions to reduce color washout that can result from IR radiation. Because the solenoid 92 defaults to the first position in the non-powered state, the IR filter 70 is in a safe state wherein the IR radiation is attenuated. The solenoid 92 activates during low light conditions, such as in the evening or at night, to move the IR filter holder 72 and, thus, the IR filter 70 to the second position so that the image sensor 80' is exposed to IR radiation for producing high quality, visible images. When daylight and bright conditions reemerge, the solenoid 92 returns the IR filter 70 to the first position. It will be apparent to one skilled in the imaging system art that mechanisms other than the solenoid 92 can be used to move the IR filter 70 between the first and second positions.

The solenoid 92 is controlled by a Microchip microprocessor that utilizes an algorithm employing an output of the camera 36' to determine when the IR filter 70 should be positioned in the optical path of the image sensor 80' or removed from the optical path of the image sensor 80' to optimize image quality. The output of the camera 36' that is used by the algorithm is indicative of the light conditions in the vicinity of the camera module 60'. The output can be a numerical value or an ordinal indicator, a direct output of the image sensor 80', or an output that has been manipulated or produced by a processor or similar device in communication with the image sensor 80'. The algorithm compares the output indicative of the light conditions to one or more predetermined threshold values and uses the relationship between the output and the one or more predetermined threshold values to control the activation of the solenoid 92. For example, if the output reaches the one or more predetermined threshold values, which indicates that the light conditions have substantially changed, the microprocessor activates the solenoid 92 to either move the IR filter 70 from the first position to the second position or to return the IR filter 70 to the first position. Conversely, if the output indicates that the light conditions have not changed substantially, i.e., the output has not reached the one or more predetermine values, then the microprocessor does not activate the solenoid 92, and, therefore, the IR filter 70 does not move from its current position.

Figure 19:
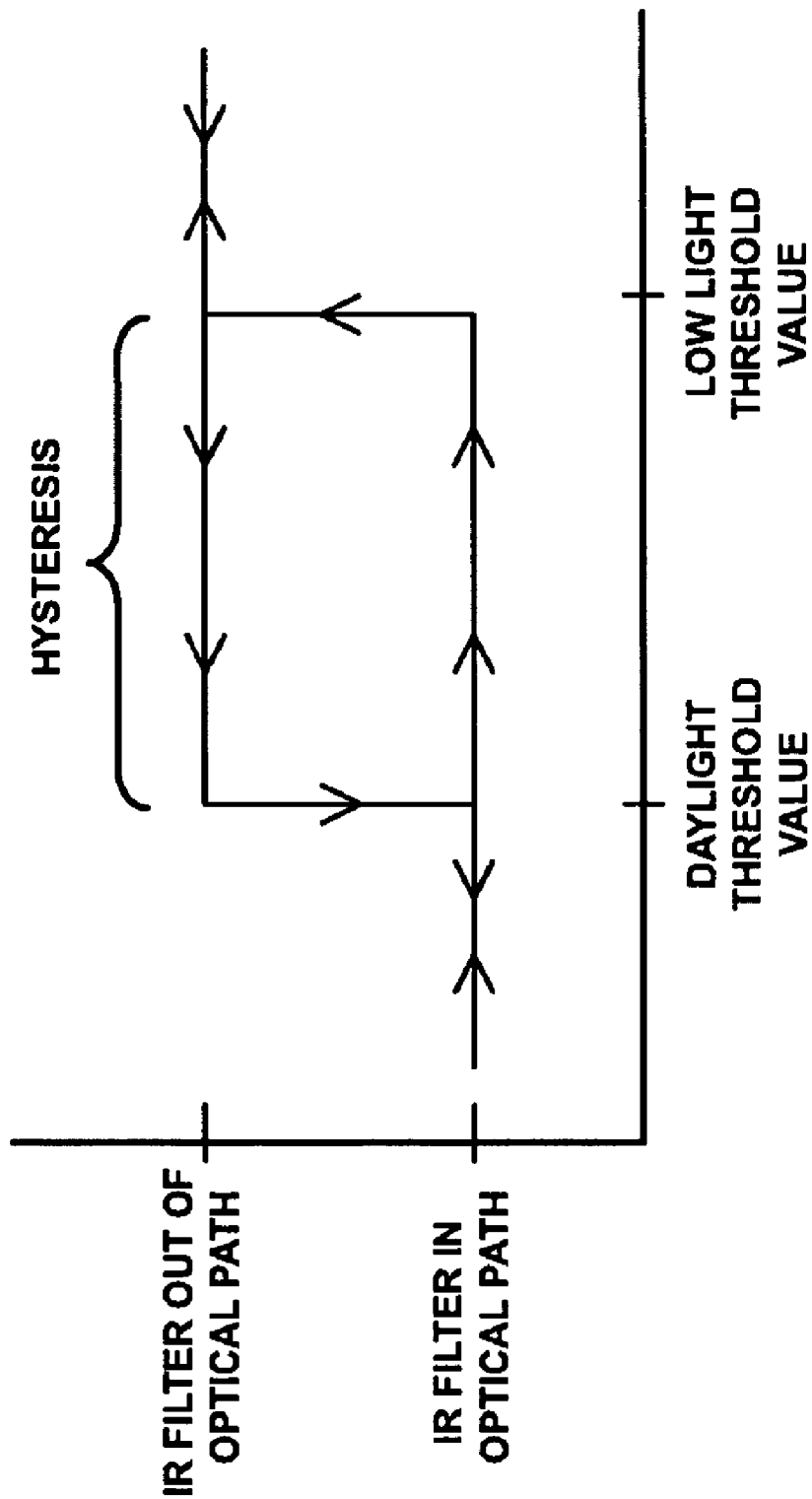
FIG. 19 is a schematic illustrating threshold values and hysteresis involved in controlling movement of the infrared filter in the camera module of FIG. 15.

Preferably, two threshold values are used to determine the conditions under which the solenoid 92 is activated to move the IR filter 70. As schematically illustrated in FIG. 19, a first or daylight threshold value corresponds to the output value below which the IR filter is preferably positioned in the optical path of the image sensor 80' (if the output value is inversely proportional to the light conditions) or, alternatively, removed from the optical path of the image sensor 80' (if the output value is directly proportional to the light conditions). A second or low light threshold value corresponds to the output value above which the IR filter is preferably removed from the optical path of the image sensor 80' (if the output value is inversely proportional to the light conditions) or, alternatively, positioned in the optical path of the image sensor 80' (if the output value is directly proportional to the light conditions). The schematic illustration of FIG. 19 and the description that follows assumes that the output value is inversely proportional to the light conditions. The terms "daylight threshold value" and "low light threshold value" are utilized herein for explanatory purposes and are not meant to limit the invention in any manner. The "daylight threshold value" does not necessarily correspond to light conditions during a time period corresponding to daytime. Rather, "daylight" can refer to any light conditions that are similar to the light conditions present during typical daylight hours, and "daylight" can be produced with both natural and artificial lighting. In other words, "daylight" corresponds to the light conditions wherein the camera 36' requires the IR filter 70 to be in the first position in order to produce useable images. Similarly, "low light" corresponds to the light conditions wherein the camera 36 requires the IR filter 70 to be in the second position to produce useable images.

Utilizing the two threshold values creates a hysteresis between the daylight threshold value and the low light threshold value to prevent unnecessary rapid movement of the IR filter holder 72 and subsequent burnout of the solenoid 92 when the output is near the daylight threshold value or the low light threshold value. As the output increases from below the daylight threshold value and surpasses the daylight threshold value, the solenoid 92 does not activate until the output equals the low light threshold value. Conversely, as the output decreases from above the low light threshold value and falls below the low light threshold value, the solenoid does not move the IR filter holder 72 until the output equals the daylight threshold value.

Figure 20:
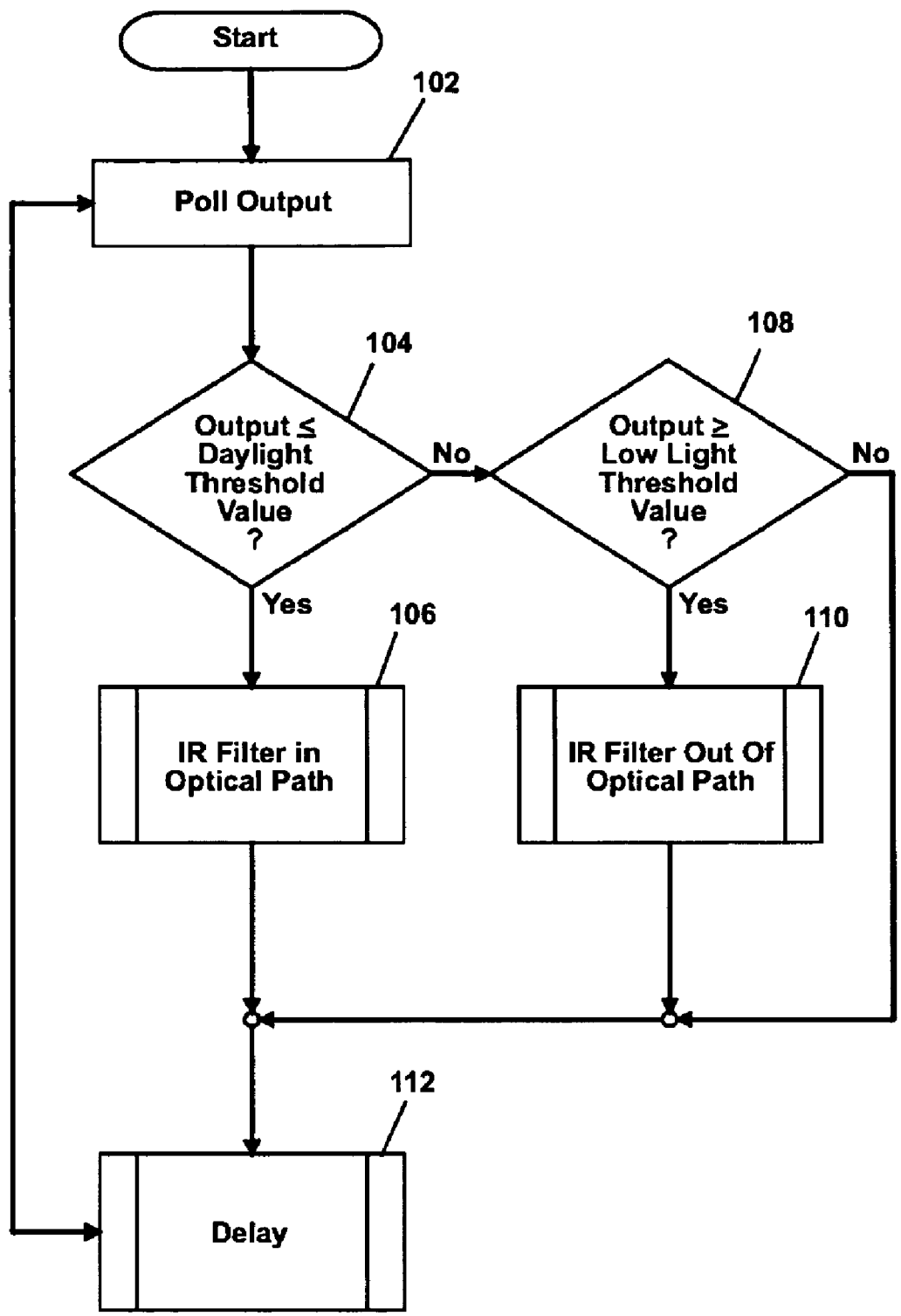
FIG. 20 is a flow chart depicting steps of an algorithm for controlling movement of the infrared filter in the camera module of FIG. 15.

The algorithm that incorporates the hysteresis described above is shown schematically in the flow chart of FIG. 20. The algorithm begins by reading or polling the output in step 102 and then compares the output to the daylight threshold value in step 104. If the output is equal to or less than the daylight threshold value, then the microprocessor determines in step 106 that the IR filter 70 must be in the optical path of the image sensor 80' and activates the solenoid 92 to move the IR filter 70 to the first position if it is not already in the first position. Conversely, if the output is not equal to or less than the daylight threshold value, then the microprocessor compares the output to the low light threshold value in step 108. If the output is equal to or greater than the low light threshold value, then the microprocessor determines in step 110 that the IR filter 70 must be out of the optical path of the image sensor 80' and activates the solenoid 92 to move the IR filter 70 to the second position if it is not already in the second position. However, if the output is not greater than or equal to the low light threshold value, then the output resides within the hysteresis, and the position of the IR filter 70 is not changed. After steps 106, 110, or, if the output resides in the hysteresis, step 108, the algorithm proceeds to step 112, which is a delay of a predetermined duration ranging from zero to a desired maximum value. After the delay, the algorithm returns to step 102 and repeats. When the delay equals zero, the algorithm continuously repeats without a pause between each execution of the algorithm. Preferably, the delay is equal to approximately 300 ms.

Preferably, the output utilized in the algorithm is a gain (or a value derived from the gain) that is applied to the pixels as the signal from the image sensor 80' passes through an amplifier before being displayed as an image. The gain is a multiplying factor that essentially increases the brightness of the pixels to improve the image. As described in the background of the invention, the gain is a function of exposure and is determined by an Automatic Gain Control (AGC) algorithm. In general, the gain is inversely proportional to the light conditions and, thus, the gain increases in low light conditions. Hence, when the gain is equal to or less than the daylight threshold value, the light conditions are categorized as daylight or bright light, and the IR filter 70 must be in the first position. Conversely, when the gain is equal to or greater than the low light threshold value, the light conditions are characterized as low light, and the IR filter 70 must be in the second position. If the gain is between the daylight threshold value and the low light threshold value, then the gain is in the hysteresis. It will be apparent to one skilled in the imaging system art that outputs other than the gain can be used by the algorithm. Exemplary outputs include other camera settings or parameters, such as the exposure/integration time and a white balance.

The particular values for the daylight and low light threshold values are empirically determined and are selected to optimize image quality. When the output value is the gain, the daylight threshold value is preferably equal to or less than 2, and the low light threshold value is preferably greater than 1. For example, the daylight threshold value can be 1 or 2, while exemplary values for the low light threshold value are 2, 4, 8, or 16.

The algorithm can employ pixel metrics that are taken from the whole image or from particular regions of interest (ROI) within a field of view (FOV) of the image sensor 80. Further, the algorithm can use multiple numbers of ROIs and different ROIs for pixel analysis that is based on the camera settings or parameters, including, but not limited to, gain, exposure, and white balance. Additionally, the pixels can be filtered within the ROI before deriving an average, and the filter can be linear, such as a simple average, or non-linear, such as a median. The image can also be pre-processed, such as by employing edge detection to determine a contrast ratio. The pixel metrics can include, but are not limited to, mean, median, correlation, minimum, maximum, standard deviation, and variance. Furthermore, the pixel metrics can be used independently or processed together in various combinations.

Each of the above embodiments of the invention can be employed alone or in various combinations thereof to engineer a vehicle imaging environment having ideal IR filtration and supplemental illumination. The camera and supplemental illumination module 30 can be utilized alone or, optionally, with any number of supplemental illumination modules 58. Alternatively, the camera module 60 or 60' may be desired for certain applications where it can be used alone or, optionally, can be accompanied by one or more supplemental illumination modules 58. Furthermore, the vehicle 10 can be equipped with more than one camera 36, which can be in the form of more than one camera module 60 or 60', more than one camera and supplemental illumination module 30, or combinations of the two types of modules 60 or 60' and 30. When more than one module 30, 58, 60, or 60' is employed, regardless of type, the modules 30, 58, 60, or 60' can all be mounted in the same location or can be mounted in different locations. For example, the camera and supplemental illumination module 30 can be mounted in the lightbar 16 while the supplemental illumination modules 58 can be mounted in the tail lamps 18. In short, any combination of the modules 30, 58, 60, and 60' can be mounted in any suitable location on the vehicle 10.

Figure 21:
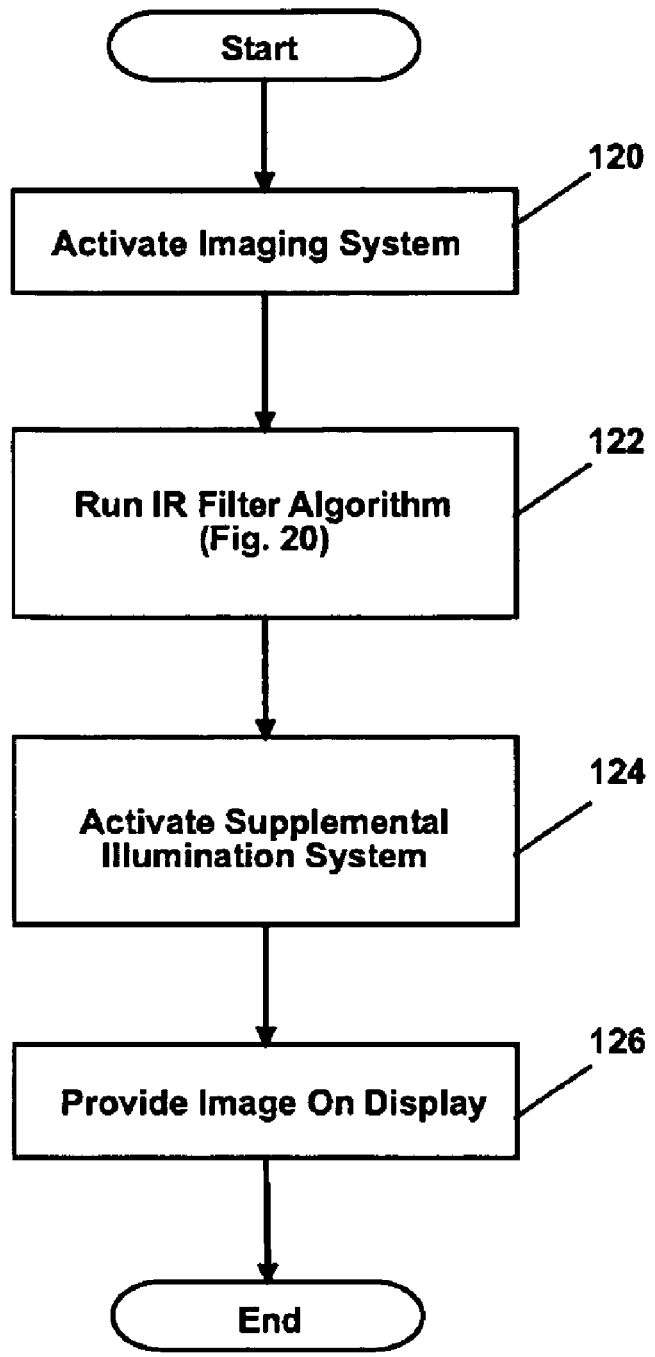
FIG. 21 is a flow chart depicting steps of operating the embodiments of FIGS. 1 and 13-15.

Referring now to FIG. 21, the operation of the vehicle equipped with at least one of the modules 30, 58, 60, and 60' initiates when a driver of the vehicle 10 performs a function that involves the assistance of the imaging system and/or the supplemental illumination system, such as when attempting to parallel park without sufficient view of the umbral regions behind the vehicle 10, towing a trailer behind the vehicle 10, or monitoring the interior of the vehicle 10 behind the driver. The imaging system of the module 30, 60, or 60' is activated in step 120 such as by manual actuation by the vehicle driver from within the interior of the vehicle 10 and/or by automatic actuation such as by placement of the vehicle transmission into a reverse gear, thus indicating a condition where the vehicular imaging system would be used. Alternatively, the module 30, 60, or 60' can be equipped with sensors to detect objects within certain distance of the vehicle, and the module 30, 60, or 60' can be automatically activated when objects are within a predetermined distance of the vehicle 10, i.e., another predetermined condition where the imaging system is designed to be used.

Once the module 30, 60, or 60' activates, the imaging system in step 122 runs the algorithm shown schematically in FIG. 20 and described above to either maintain the IR filter 70 in the first position, to move the IR filter 70 to the second position, or to maintain the IR filter 70 in the second position, depending on the light conditions and the output indicative of the light conditions. As described above, the algorithm runs in a loop to update the position of the IR filter 70 based on any changes in the light conditions. Alternatively, if the IR filter is a photochromic IR filter, then IR filter automatically adjusts its IR attenuation according to the intensity of UV radiation in the vicinity of the IR filter. During normal daylight conditions when the UV radiation intensity is above the predetermined value, the photochromic IR filter transmits the visible light and attenuates the IR radiation such that the video images are clear and not affected by the IR radiation. During low light conditions when the UV radiation intensity is below the predetermined value, such as during the night or cloudy days, the photochromic IR filter transmits the IR radiation that illuminates the field of view of the image sensor 80 and increases the quality and visibility of the video images.

Next, the supplemental illumination system of the module 30 or 58 can be activated in step 124 such that the light source 38 illuminates the area 34 so that the camera 36 can capture visible video images of the desired regions. Alternatively, the imaging system can be utilized without the supplemental illumination system if the supplemental illumination is not necessary for the camera 36 to capture visible images. In some instances, the light conditions are bright enough such that the supplemental illumination is not needed, or the vehicle 10 produces adequate lighting for the imaging system. If the supplemental illumination system is utilized, then it is preferably activated after step 122 so that the supplemental illumination system does not interfere with activation of the IR filter 70. Optionally, the supplemental illumination system can be adapted so that it cannot be activated until the algorithm for determining the position of the IR filter 70 has initiated or until the imaging system has been activated.

After the IR filter 70 is properly positioned and the supplemental illumination system is optionally activated, video images are communicated to the display 32 near the driver in step 126 to assist the driver in parking, towing a trailer, monitoring the interior of the vehicle 10, and the like. After the driver no longer requires the assistance of the vehicular imaging system, the module 30, 58, 60, or 60' is deactivated manually and/or automatically.

As an alternative to the photochromic IR filter coating or to the IR filter 70 that moves relative to the optical path of the image sensor 80 as a result of the output from the camera 36, the IR filter can comprise a separate element, such as a thin glass or plastic element that is manually inserted into or removed from the optical path of the image sensor 80 or automatically moved relative to the optical path as a result of another parameter independent of the camera 36, such as light sensors mounted to the module or to the vehicle 10 and in communication with the module. The IR filter can assume any form suitable for placement in the optical path of the image sensor 80. Additionally, any of the components of the camera 36 that are in the optical path of the image sensor 80 can have an IR filter integral therewith or embedded therein to eliminate the need for a separate coating or IR filter element. Further, it is within the scope of the invention for the IR filter to be located along the optical path of a image sensor disposed in another type of module or housing other than those described above.

The modules 30, 58, 60, and 60' according to the current invention offer several advantages. The modules provide a cost-effective solution to the low light sensitivity of CMOS and other similar cameras. Not only are the components inexpensive, but also the modules are relatively simple to manufacture and assemble. With a lower system cost, it is more likely that imaging systems and the safety-related benefits associated therewith will be incorporated into vehicles. Additionally, because the modules comprise a tight gasket seal and are snug fit into the lightbar or other vehicle components, they are extremely robust and resist potentially degrading environmental conditions. Furthermore, the modules are designed to be easily integrated with existing vehicle components; therefore, they do not detract from the aesthetic appearance of the vehicle and do not interfere with existing standard lighting systems.

The imaging system according to the invention can produce clean and visible video images in both daylight and low light conditions. Because the photochromic IR filter alters its IR attenuation according to the intensity of the UV radiation in its vicinity, the image sensor is automatically exposed to amount of IR radiation suitable for the lighting conditions in its field of view. Similarly, the IR filter that moves relative to the optical path of the image sensor as a result of an output of the camera automatically adjusts to the light conditions and to changes in the light conditions. Further, the hysteresis that is incorporated into the algorithm for moving the IR filter protects the mechanism for moving the IR filter and improves the performance of the imaging system.

While the invention has been specifically described in connection with certain specific embodiments thereof, it is to be understood that this is by way of illustration and not of limitation, and the scope of the appended claims should be construed as broadly as the prior art will permit.

The invention claimed is:

1. An imaging system for use in an exterior or interior of a vehicle, the imaging system comprising:
   a camera having an image sensor with an associated optical path, the image sensor adapted for generating an output that is indicative of lighting conditions in a viewing area of the camera; and
   an infrared filter associated with the image sensor for attenuating infrared radiation;
   wherein the infrared filter is movable as a result of the output of the image sensor, between a first position in which the infrared filter is disposed in the optical path of the image sensor for preventing transmission of the infrared radiation to the image sensor, and a second position in which the infrared filter is spaced from the optical path of the image sensor and does not prevent transmission of the infrared radiation to the image sensor; and
   wherein, when the output is less than a first threshold, the infrared filter is in the first position, and when the output is greater than a second threshold which is greater than the first threshold, the infrared filter is in the second position.

2. The imaging system according to claim 1, wherein the output is a gain determined by an Automatic Gain Control.

3. The imaging system according to claim 1, wherein the output is a value representative of a gain determined by an Automatic Gain Control.

4. The imaging system according to claim 1, wherein the output is an exposure.

5. The imaging system according to claim 1, wherein the output is a white balance.

6. The imaging system according to claim 1, wherein the second threshold is twice the first threshold.

7. The imaging system according to claim 1, wherein the infrared filter automatically moves between the first position and the second position as a result of lighting conditions in the viewing area of the camera.

8. The imaging system according to claim 7 and further comprising a solenoid that moves the infrared filter between the first position and the second position.

9. The imaging system according to claim 1, wherein the infrared filter is manually moved between the first position and the second position.

10. The imaging system according to claim 1, wherein the camera further comprises an infrared filter holder for mounting the infrared filter to the camera.

11. The imaging system according to claim 10, wherein the infrared filter holder pivots relative to the image sensor to move the infrared filter between the first position and the second position.

12. The imaging system according to claim 1, wherein the image sensor comprises a focal length, and the infrared filter has a thickness that does not substantially change the focal length of the image sensor as the infrared filter moves between the first position and the second position.

13. The imaging system according to claim 1 and further comprising a supplemental illumination system comprising at least one light source for providing supplemental illumination to the viewing area of the camera.

14. The imaging system according to claim 13, wherein the at least one light source comprises a light emitting diode.

15. The imaging system according to claim 14, wherein the light emitting diode is an infrared light emitting diode.

16. The imaging system according to claim 14, wherein the light emitting diode is a white light emitting diode.

17. The imaging system according to claim 14, wherein the light emitting diode is a colored light emitting diode.

18. The imaging system according to claim 13, wherein the vehicle comprises a license plate lightbar, and the supplemental illumination system is mounted to the lightbar.

19. The imaging system according to claim 1, wherein the vehicle comprises a center high mount stop lamp, and the supplemental illumination system is mounted to the center high mount stop lamp.

20. The imaging system according to claim 1, wherein the vehicle comprises at least one tail lamp, and the supplemental illumination system is mounted to the at least one tail lamp.

21. The imaging system according to claim 1, wherein the camera and the supplemental illumination system form a unitary module.

22. The imaging system according to claim 1, wherein the at least one light source is directed rearwardly of the vehicle.

23. The imaging system according to claim 1, wherein the supplemental illumination system is selectively actuable when the imaging system is activated.

24. The imaging system according to claim 1, wherein the supplemental illumination system is selectively actuable when the infrared filter is automatically positioned in one of the first position and the second position in accordance with lighting conditions in a viewing area of the camera.

25. The imaging system according to claim 1, wherein the image sensor is a complimentary metal oxide semiconductor.

26. The imaging system according to claim 1, wherein the infrared radiation comprises wavelengths between about 700 nm and 1 mm.

27. The imaging system according to claim 1, wherein the infrared radiation comprises near-infrared radiation.

28. An imaging system for use in an exterior or interior of a vehicle, the imaging system comprising:
- a camera having an image sensor with an associated optical path, and a viewing area; and
- an infrared filter associated with the image sensor for selectively attenuating infrared radiation, and movable as a result of an output of the image sensor indicative of light conditions in the viewing area of the camera, between a first position, in which the infrared filter is disposed in the optical path of the image sensor for preventing transmission of the infrared radiation to the image sensor, and a second position, in which the infrared filter is spaced from the optical path of the image sensor and does not prevent transmission of the infrared radiation to the image sensor;
- wherein the infrared filter is automatically responsive to light conditions in the viewing area such that the infrared filter prevents the image sensor from being exposed to infrared radiation when light conditions in the viewing area correspond to bright light conditions and does not prevent the image sensor from being exposed to infrared radiation when the light conditions in the viewing area correspond to low light conditions; and
- wherein, when the output is less than a first threshold, the infrared filter is in the first position, and when the output is greater than a second threshold which is greater than the first threshold, the infrared filter is in the second position.

29. The imaging system according to claim 28, wherein the output is a gain determined by an Automatic Gain Control.

30. The imaging system according to claim 28, wherein the output is a value representative of a gain determined by an Automatic Gain Control.

31. The imaging system according to claim 28 and further comprising a supplemental illumination system comprising at least one light source for providing supplemental illumination to the viewing area of the camera.

32. The imaging system according to claim 31, wherein the at least one light source comprises a light emitting diode.

33. The imaging system according to claim 32, wherein the supplemental illumination system is selectively actuable when the imaging system is activated.

34. The imaging system according to claim 28, wherein an indication of light conditions in the vicinity of the camera comprises a gain applied to pixels of an image captured by the image sensor.

35. An imaging system for use in an exterior or interior of a vehicle, the imaging system comprising:
- a camera having an image sensor for generating an image output representative of an image captured by the image sensor with an associated optical path and viewing area, the image sensor generating a light condition output that is indicative of lighting conditions in the viewing area; and
- an infrared filter associated with the image sensor, and movable between a first position, wherein the infrared filter is disposed in the optical path of the image sensor for preventing transmission of the infrared radiation to the image sensor, and a second position, wherein the infrared filter is spaced from the optical path of the image sensor and does not prevent transmission of the infrared radiation to the image sensor;
- wherein the infrared filter moves to the first position to prevent the image sensor from being exposed to infrared radiation when the light condition output of the image sensor is less than a first threshold value corresponding to bright light conditions, and moves to the second position to not prevent the image sensor from being exposed to infrared radiation when the light condition output is greater than a second threshold value corresponding to low light conditions, that is twice the first threshold value.

* * * * *

UNITED STATES PATENT AND TRADEMARK OFFICE
CERTIFICATE OF CORRECTION

PATENT NO.      : 7,619,680 B1                           Page 1 of 1
APPLICATION NO. : 10/710412
DATED           : November 17, 2009
INVENTOR(S)     : Bingle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1499 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,619,680 B1
APPLICATION NO. : 10/710412
DATED : November 17, 2009
INVENTOR(S) : Robert L. Bingle et al.

It is certified that error appears in the above-identified patent and that said Letters Patent is hereby corrected as shown below:

Claim 19, Col. 16, line 56 reads: "The imaging system according to claim 1, wherein the..."
It should read: "The imaging system according to claim 13, wherein the..."

Claim 20, Col. 16, line 60 reads: "The imaging system according to claim 1, wherein the..."
It should read: "The imaging system according to claim 13, wherein the..."

Claim 21, Col. 16, line 63 reads: "The imaging system according to claim 1, wherein the..."
It should read: "The imaging system according to claim 13, wherein the..."

Claim 22, Col. 16, line 66 reads: "The imaging system according to claim 1, wherein the..."
It should read: "The imaging system according to claim 13, wherein the..."

Claim 23, Col. 17, line 1 reads: "The imaging system according to claim 1, wherein the..."
It should read: "The imaging system according to claim 13, wherein the..."

Claim 24, Col. 17, line 4 reads: "The imaging system according to claim 1, wherein the..."
It should read: "The imaging system according to claim 13, wherein the..."

Signed and Sealed this

Twenty-first Day of December, 2010

David J. Kappos
*Director of the United States Patent and Trademark Office*